(12) United States Patent
Pelka et al.

(10) Patent No.: US 6,784,603 B2
(45) Date of Patent: Aug. 31, 2004

(54) FLUORESCENT LIGHTING APPARATUS

(75) Inventors: David G. Pelka, Los Angeles, CA (US); William A. Parkyn, Lomita, CA (US)

(73) Assignee: Teledyne Lighting and Display Products, Inc., Los Angeles, CA (US)

( * ) Notice: Subject to any disclaimer, the term of this patent is extended or adjusted under 35 U.S.C. 154(b) by 0 days.

(21) Appl. No.: 10/199,991

(22) Filed: Jul. 18, 2002

(65) Prior Publication Data

US 2003/0085642 A1 May 8, 2003

Related U.S. Application Data

(60) Provisional application No. 60/306,807, filed on Jul. 20, 2001.

(51) Int. Cl.$^7$ .............................. H01J 5/16; G02B 6/10
(52) U.S. Cl. ....................... 313/113; 313/110; 313/111; 362/555; 362/558; 385/129; 385/130
(58) Field of Search .................. 313/110–114; 362/555, 362/558, 84, 34, 318; 385/129–132, 900–900.1, 147; 359/34

(56) References Cited

U.S. PATENT DOCUMENTS

| | | |
|---|---|---|
| 1,153,446 A | 9/1915 | Roffy |
| 1,235,275 A | 7/1917 | Wood |
| 1,748,057 A | 2/1930 | Arbuckle |

(List continued on next page.)

FOREIGN PATENT DOCUMENTS

| | | | |
|---|---|---|---|
| DE | 3529488 A1 * | 2/1987 | ............. F21S/5/00 |
| EP | 0 660 648 A1 | 6/1995 | |
| EP | 0 733 850 A2 | 9/1996 | |
| GB | 2131589 | 6/1984 | |
| JP | 62175702 A | 8/1987 | |
| JP | 63110403 A | 5/1988 | |
| WO | WO 87/04230 | 7/1987 | |
| WO | WO 98/21917 | 5/1998 | |
| WO | WO 98/26212 | 6/1998 | |
| WO | WO 99/06759 | 3/1999 | |
| WO | WO 00/54340 | 9/2000 | |

OTHER PUBLICATIONS

Arl Rabl et al., *Ideal concentrators for finite sources and restricted exit angles*, Applied Optics, vol. 15, No. 11, Nov. 1976, pp. 58–61.

D. Jenkins et al., *Integral design method for nonimaging concentrators*, J. Opt. Soc. Am. A, vol. 13, No. 10, Oct. 1996, pp2106–2116.

(List continued on next page.)

*Primary Examiner*—Ashok Patel
*Assistant Examiner*—German Colón
(74) *Attorney, Agent, or Firm*—Kirkpatrick & Lockhart LLP

(57) ABSTRACT

A light source useful for a wide variety of lighting applications such as signage, architectural or automotive designs, as well as cosmetic and/or functional features for other products can be created by combining a light collector comprising a sheet of material having a fluorescent substance incorporated therein and an optical element juxtaposed adjacent the collector. Light incident on the collector induces fluorescence that is trapped by total internal reflection, concentrated, and radiated from an edge of the collector. The size of collector plate with respect to its thickness is such that it provides an intensified image along its edge that is readily visible during both daytime and nighttime. The optical element modifies the distribution of light output from an edge of the collector. The optical element is preferably configured to decrease divergence of light emitted from the edge. The optical element may also direct the light emitted from the collector above or below the plane of the collector. Preferably, this optical element comprises a non-imaging optical element. The collector design can also be varied as required. The collector for example can be bent to direct light upward or downward and may comprise a stack of layers or a series of segments that fluoresce at different wavelengths so as to produce multicolored output.

46 Claims, 22 Drawing Sheets

U.S. PATENT DOCUMENTS

| | | |
|---|---|---|
| 1,998,967 A | 4/1935 | Raynolds |
| 2,120,836 A | 6/1938 | Grimes |
| 2,255,819 A | 9/1941 | Salani |
| 3,821,590 A | 6/1974 | Kosman et al. |
| 3,890,497 A | 6/1975 | Rush |
| 3,934,148 A | 1/1976 | Collins |
| 3,957,351 A | 5/1976 | Stockwell |
| 4,114,592 A | 9/1978 | Winston |
| 4,128,332 A | 12/1978 | Rowe |
| 4,130,107 A | 12/1978 | Rabl et al. |
| 4,149,902 A | 4/1979 | Mauer et al. |
| 4,210,954 A | 7/1980 | Laser |
| 4,230,095 A | 10/1980 | Winston |
| 4,237,332 A | 12/1980 | Winston |
| 4,240,692 A | 12/1980 | Winston |
| 4,254,453 A | 3/1981 | Mouyard et al. |
| 4,262,206 A | 4/1981 | Viehmann |
| 4,274,127 A | 6/1981 | Beck et al. |
| 4,292,959 A | 10/1981 | Coburn, Jr. |
| 4,320,442 A | 3/1982 | McCamy |
| 4,359,265 A | 11/1982 | Winston |
| 4,379,613 A | 4/1983 | Coburn |
| 4,387,961 A | 6/1983 | Winston |
| 4,392,750 A | 7/1983 | Mettler |
| 4,422,135 A | 12/1983 | McCamy |
| 4,492,778 A | 1/1985 | Claussen et al. |
| 4,539,625 A * | 9/1985 | Bornstein et al. ........... 362/576 |
| 4,561,043 A | 12/1985 | Thompson |
| 4,661,649 A | 4/1987 | Reisfeld et al. |
| 4,733,332 A | 3/1988 | Yamashita et al. |
| 4,739,152 A | 4/1988 | Downs |
| 4,755,916 A | 7/1988 | Collins |
| 4,865,417 A | 9/1989 | Yamamoto Naohiro |
| 4,941,723 A | 7/1990 | Sasada |
| 4,965,876 A | 10/1990 | Földi et al. |
| 4,985,809 A | 1/1991 | Matsui et al. |
| 5,040,098 A | 8/1991 | Tanaka et al. |
| 5,095,099 A | 3/1992 | Parkinson et al. |
| 5,128,846 A | 7/1992 | Mills et al. |
| 5,184,114 A | 2/1993 | Brown |
| 5,227,773 A | 7/1993 | Wu et al. |
| 5,260,957 A | 11/1993 | Hakimi et al. |
| 5,271,077 A | 12/1993 | Brockman et al. |
| 5,321,417 A | 6/1994 | Voelzke et al. |
| 5,332,910 A | 7/1994 | Haraguchi et al. |
| 5,410,453 A | 4/1995 | Ruskouski |
| 5,432,876 A | 7/1995 | Appeldorn et al. |
| 5,481,637 A | 1/1996 | Whitehead |
| 5,502,623 A | 3/1996 | Brotz |
| 5,548,676 A | 8/1996 | Savage, Jr. |
| 5,586,013 A | 12/1996 | Winston et al. |
| 5,606,163 A | 2/1997 | Huston et al. |
| 5,659,643 A | 8/1997 | Appeldorn et al. |
| 5,677,972 A | 10/1997 | Popovich |
| 5,678,913 A | 10/1997 | Ishimaru et al. |
| 5,685,634 A | 11/1997 | Mulligan |
| 5,704,708 A | 1/1998 | Barson et al. |
| 5,709,453 A | 1/1998 | Krent et al. |
| 5,721,795 A | 2/1998 | Pelka |
| 5,757,557 A | 5/1998 | Medvedev et al. |
| 5,779,351 A | 7/1998 | Erickson et al. |
| 5,806,955 A | 9/1998 | Parkyn, Jr. et al. |
| 5,813,753 A | 9/1998 | Vriens et al. |
| 5,816,693 A | 10/1998 | Winston et al. |
| 5,878,070 A | 3/1999 | Ho et al. |
| 5,881,200 A | 3/1999 | Burt |
| 5,924,788 A | 7/1999 | Parkyn, Jr. |
| 5,949,581 A | 9/1999 | Kurtenbach et al. |
| 5,980,063 A | 11/1999 | Ford et al. |
| 5,982,969 A | 11/1999 | Sugiyama et al. |
| 5,997,155 A | 12/1999 | Ducharme et al. |
| 6,005,707 A | 12/1999 | Berggren et al. |
| 6,031,859 A | 2/2000 | Nambu |
| 6,059,438 A * | 5/2000 | Smith et al. ................ 362/583 |
| 6,095,673 A | 8/2000 | Goto et al. |
| 6,103,006 A | 8/2000 | DiPietro |
| 6,123,442 A | 9/2000 | Freier et al. |
| 6,257,737 B1 | 7/2001 | Marshall et al. |
| 6,272,265 B1 * | 8/2001 | Franklin ...................... 385/31 |
| 6,294,794 B1 | 9/2001 | Yoshimura et al. |
| 6,422,712 B1 | 7/2002 | Nousiainen et al. |
| 6,637,924 B2 * | 10/2003 | Pelka et al. ................. 362/555 |
| 2002/0127224 A1 | 9/2002 | Chen |

OTHER PUBLICATIONS

D. Jenkins et al., *Tailored Reflectors for Illumination*, Applied Optics, vol. 35, No. 10, Apr. 1996, pp. 1669–1672.

David Rotman, *Quantum Dot Com, Technology Review*, Jan./Feb. 2000, pp. 50–57.

G.E. Jabbour et al., *Aluminum Composite Cathodes A new Method for the Fabrication of Efficient and Bright Organic Light–emitting Devices*, Optics & Photonics News, Apr. 1999, pp. 25–27.

Hewlett Packard catalog, Super Flux LEDs Technical Data, (date unknown), 3 pages.

I.M. Bassett et al., *The collection of diffuse light onto an extended absorber*, Reprinted from *Optical and Quantum Electronics*, vol. 10, 1978, 2 pages.

Jose L. Älvarez et al., Paper on *RXI concentrator for 1000X photovoltaic energy conversion*.

Juan C. Minano et al., Paper on *New non–imaging designs: The RX and the RXI concentrators*.

K. H. Schmidt et al., *Size quantization effects in InAs self–assembled quantum dots*, Appl. Phys. Letter, vol. 70, No. 13, Mar. 31, 1997, pp. 1727–1729.

Keith Barnham et al., *Quantum–dot concentrator and thermodynamic model for the global redshift*, Applied Physics Letter, vol. 76, No. 9, Feb. 28, 2000, pp. 1197–1199.

LumiLeds Product Showcase http://www.lumileds.com/producs.html Oct. 11, 2000, 4 pages.

LumiLeds Red LED Rail Designer Kit, (date unknown), 5 pages.

N. C. Greenham et al., *Charge separation and transport in conjugated–polymer/semiconductor–nanocrystal composites studied by photoluminescence quenching and photoconductivity*, Physical Review B, vol. 54, No. 24, Dec. 15, 1996, pp. 17 628–17 637.

Olga I. Micic et al., *Highly efficient band–edge emission from InP quantum dots*, Appl. Phys. Letter, vol. 68, No. 22, May 27, 1996, pp. 3150–3152.

R. Winston, *Selected Papers in Nonimaging Optics*, SPIE, vol. MS106, 1995.

Slides on third party presentation at Monterey Conference, date unknown, 10 pages.

T. Tokizaki et al., *Linear and nonlinear optical properties of CdSe microcrystallites in glasses*, Journal of Crystal Growth, vol 117, Feb. 1992, pp. 603–607.

Tivoli escort lights, 1989O, 10 pages.

Tivoli the light fantastic, (date unknown), 4 pages.

U.S. patent application No. 09/334,848 filed Jun. 16, 1999.

U.S. patent application No. 09/620,051 filed Jul. 20, 2000.

U.S. patent application No. 09/800,067 filed Mar. 6, 2001.

U.S. patent application No. 09/800,073 filed Mar. 6, 2001.

U.S. patent application No. 09/948,507 filed Sep. 6, 2001.

U.S. patent application No. 09/993,286 filed Nov. 14, 2001.
U.S. patent application No. 10/199,991 filed Jul. 18, 2002.
W.T. Welford et al., *High Collection Nonimaging Optics*, Academic Press, 1989.
W.T. Welford et al., Paper on *The Optics of Nonimaging Concentrators Light and Solar Energy*, 1978, pp. 29–32.

William A. Parkyn, *Segmented illumination lenses for step-lighting and wall–washing*, (date unknown), 8 pages.
William A. Parkyn, *The design of illumination lenses via extrinsic differential geometry*, (date unknown), 9 pages.

* cited by examiner

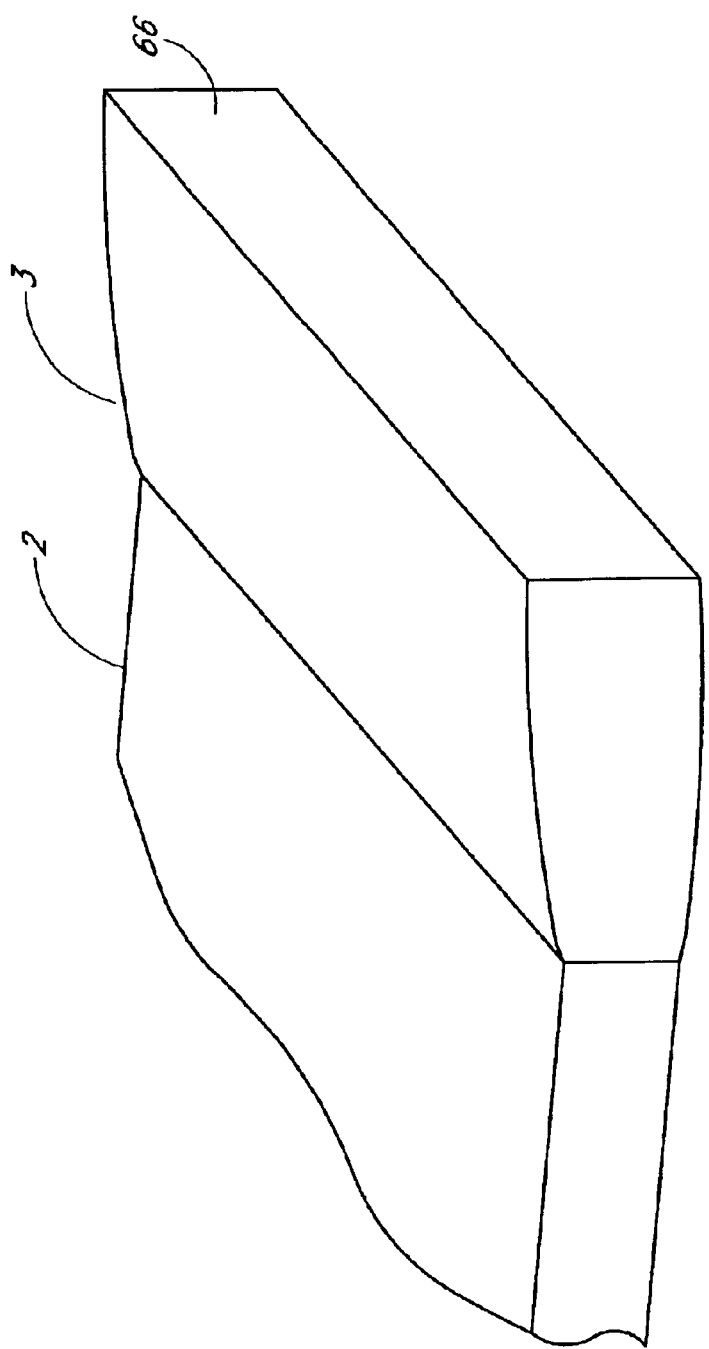
FIG. 8A
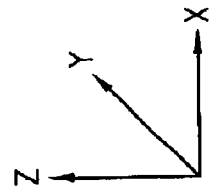

FLUORESCENT LIGHTING APPARATUS

RELATED APPLICATION

This application claims priority under 35 U.S.C. §119(e) from U.S. Provisional Patent Application No. 60/306,807, filed Jul. 20, 2001, entitled "Fluorescent Light Source."

BACKGROUND OF THE INVENTION

1. Field of the Invention

The present invention relates to lighting and more specifically to lighting comprising a transparent medium that exhibits a colored fluorescence when exposed to light.

2. Description of the Related Art

Stores, service centers, and various other business locales routinely employ bright colored signage for decorative and promotional purposes, as well as simply to impart basic information to their patrons. One common example is the neon "open" sign. Lettered signs as well as individual letters and logos are ubiquitous in commercial establishments. Bandlights produce long glowing strips of light that are often installed at the top of a building, but are also used to accent the borders of window displays, to draw attention to merchandise therein. Noble-gas & mercury-vapor lamps, commonly known as fluorescent lights, are widespread, because they provide a flexible and low-cost medium for installation within signage and bandlights.

During daylight hours, however, effective design of colored bandlights with eye-catching brightness levels poses an especially difficult problem. Disadvantageously, the luminosity offered by conventional bandlights is insufficient to produce high brightness in daylight. Ambient sunlight, which is about 10,000-foot-candle (lumens per square foot), causes object luminance (being equal to reflectivity times illuminance, expressed in foot-Lamberts) to be in the range of 500 ft-L (black objects) to 8,000 ft-L (white objects). As a result, conventional bandlights are only useful during the nighttime, when their hundreds of foot-Lamberts are very eye-catching. During daylight hours, however, they would preferably be hundreds of times brighter, not a feasible option with electrically powered devices.

Using fluorescent bandlights during the day is not only ineffective, but costly as well as electrical power must be continuously supplied to generate light. It is desirable therefore to have a light-source that will produce adequate brightness and contrast for use during daylight hours, and will not consume large amounts of power.

SUMMARY OF THE INVENTION

In one aspect of the invention, a lighting apparatus comprises a collector plate and an elongated lens. The collector plate comprises fluorescent material that radiates fluorescent emission when pumped with light having a wavelength longer than that of the fluorescent emission. The plate comprises opposed surfaces oriented to provide a waveguide that permits at least a portion of the fluorescent emission to propagate towards edges of the plate. The elongated beam-shaping optical element extends along at least one edge of the collector plate and is mounted to receive the fluorescent emission propagating in the collector plate. Preferably, the elongated beam-shaping optical element is in optical contact with the edge of the collector plate and more preferably is indexed matched thereto thereby reducing reflection losses.

In another aspect of the invention, a lighting apparatus includes a collector plate comprising fluorescent material which radiates fluorescent emission when pumped with light having a wavelength shorter than that of the fluorescent emission. The collector plate has opposed surfaces oriented to provide a waveguide that permits at least a portion of the fluorescent emission to propagate towards edges of the plate. The lighting apparatus further comprises reflective material on at least one of the edges of the collector plate to confine light therein. An elongated beam-shaping optical element extends along at least another edge of the collector plate and is mounted to receive the fluorescent emission propagating in the collector plate.

In yet another aspect of the invention, a lighting apparatus comprises a collector plate and an elongated non-imaging optical element. The collector plate comprising fluorescent material which radiates fluorescent emission when pumped with light having a wavelength shorter than that of the fluorescent emission. The plate has opposed surfaces oriented to provide a waveguide that permits at least a portion of the fluorescent emission to propagate towards edges of the plate. The elongated non-imaging optical element extends along at least one edge of the collector plate and is mounted to receive the fluorescent emission propagating in the collector plate.

In still another aspect of the invention, a lighting apparatus comprises a substantially planar collector plate and an asymmetric optical element. The collector plate comprises fluorescent material which radiates fluorescent emission when pumped with light having a wavelength shorter than that of the fluorescent emission. The plate also includes opposed surfaces oriented to provide a waveguide that permits at least a portion of the fluorescent emission to propagate through the collector plate towards an edge of the plate. The asymmetric optical element extends along the edge of the collector plate and is mounted to receive the fluorescent emission propagating in the collector plate. The asymmetric optical element is configured such that fluorescent emission is output from the asymmetric optical element asymmetrically with respect to the collector plate.

In yet another aspect of the invention, a lighting apparatus comprises a collector plate, an elongated optical element, and one or more of light sources. The collector plate comprises fluorescent material which radiates fluorescent emission when pumped with light having a wavelength shorter than that of the fluorescent emission. The collector plate also includes opposed surfaces oriented to provide a waveguide that permits at least a portion of the fluorescent emission to propagate towards edges of the collector plate. The elongated optical element extends along at least one edge of the collector plate and is mounted to receive the fluorescent emission propagating in the collector plate. The one or more light sources are disposed adjacent one edge of the collector plate to introduce light therein.

In still another aspect of the invention, a method of providing decorative illumination comprising providing a fluorescent plate on a real property structure; the fluorescent plate comprises fluorescent material that emits fluorescent light when exposed to sunlight. The real property structures are selected from the group consisting of a building, a tower, a pavilion, a canopy, an archway, a column, a post, a wall, a divider, a fence, a statue, a sculpture, a sign, and a billboard. The fluorescent plate is exposed to sunlight such that the fluorescent material emits fluorescent light. At least a substantial portion of the fluorescent light is guided within the fluorescent plate for emission from an edge thereof and emission emission of light from the edge is altered utilizing an optical element juxtaposed adjacent the edge.

In another aspect of the invention, a lighting apparatus comprises a substantially optically transmissive medium that exhibits a colored fluorescence when exposed to light. This fluorescing medium is extended in the configuration of a planar slab, which acts as a waveguide trapping a majority of the fluorescent emission via total internal reflection. One planar face receives the excitation light, preferably sunlight when the slab oriented, e.g., horizontally. The shorter wavelengths of the sunlight cause the slab's medium to fluoresce, which gives the faces of the slab a colored appearance. The luminance of most of the slab, however, is insufficient for it to elicit a strong glowing appearance due to the surrounding scene being brightly daylight. The exception is the edge of the slab. Accumulation of the waveguided light, propagating horizontally down the planar slab, results in the edge of the slab displaying a much higher brightness (5–15 times brighter) than the rest of the slab. This enhanced side-emission gives the edge of the slab an eye-catching, visually compelling glow, which is visible from virtually all directions. An optical element can be used to magnify the thickness of the slab edge, consequently reducing the solid angle within which this enhanced glow is visible, as dictated by the optical principle of the conservation of etendue (surface area multiplied by field-of-view). The pattern of emission created corresponds to a continuous elongated strip of light, similar to that produced by neon bulbs. Such a glowing edge, for example, mounted on the top of a building as a daytime bandlight, can have its emission directed downwards toward the ground, not wastefully upwards toward the sky so as to provide eye-catching signage or decoration on a building without needing to supply electrical power during daytime operation.

BRIEF DESCRIPTION OF THE DRAWINGS

FIGS. 8A–8D depicts another embodiment that includes a non-imaging optical element known as a compound parabolic concentrator (CPC).

DETAILED DESCRIPTION OF THE PREFERRED EMBODIMENT

Figure 1:
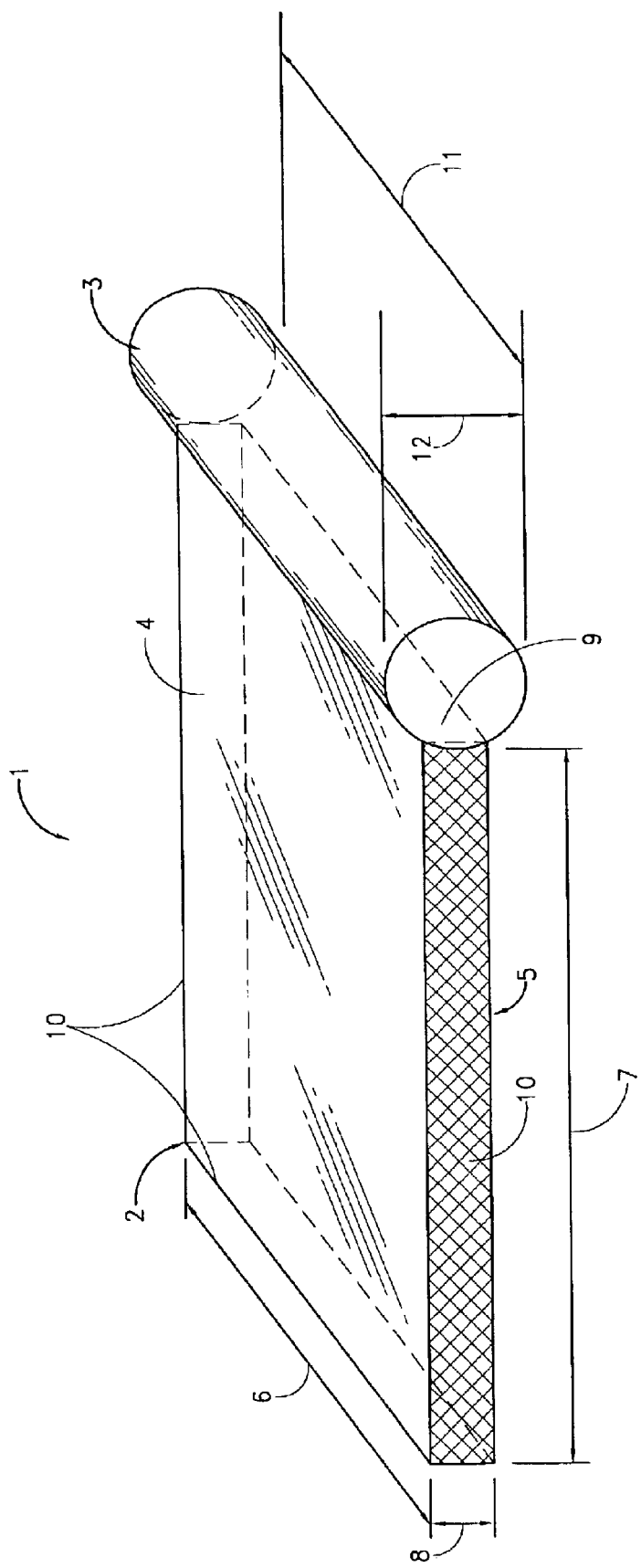
FIG. 1 is a perspective view illustrating a lighting apparatus comprising a collector and a refractive optical element attached to an edge of the collector.

As shown in FIG. 1, a lighting system 1 is formed from a substantially planar collector 2 and a lens or beam-shaping element 3 attached thereto. The collector 2 comprises a sheet having top surface 4 and bottom surface 5 and four edges. Collector 2 has length 6, width 7, and thickness 8. The four edges include an output edge 9 and three reflective edges 10. The three edges 10 each have a reflective layer formed thereon, preferably a specularly reflective layer comprising a reflective film or foil such as a dielectric multi-layer stack or a silver film. Reflective tape, available from 3M under the trade name Radiant Light Film VM 2000, is particularly effective, since it provides 99% specular reflectivity.

An XYZ coordinate system is included in FIG. 1 to provide orientation. The XY plane corresponds to a horizontal plane parallel to the plane of the collector sheet 2. The lens 3 extends lengthwise along the Y-axis and the Z-axis is perpendicular thereto and normal to the plane of the collector sheet.

The collector 2 comprises a material that transmits visible light. In preferred embodiments, this material is a polymeric material such as acrylic, polycarbonate, or silicone. This material preferably is able to act as a host for a fluorescent dye. Exemplary fluorescent acrylic material is available in several colors under the tradename 'Acrylite' from CYRO Industries of Rockaway N.J. Materials such as glass can also be used, but are less preferred because of their brittle nature and higher cost and weight.

The collector length 6 can be the length of a building, but may also be of standard sizes commercially available up to 8 feet. Width 7 preferably is at least several inches, so that luminance of the edge 9 is high. Thickness 8 may be as little as $\frac{1}{8}^{th}$-inch or smaller, and in this embodiment is much less than the length 6 and width 7 of collector 2 and is uniform over the entire body of collector 2. In other embodiments, the thickness may vary over the length 6 or 7 width thereof. In further embodiments, the length 6, width 7, thickness 8, and/or shape may be changed to accommodate specifications set by the particular intended application. Preferably, however, the collector length 6 and width 7 range between about 0.5 feet and 3 feet and about 0.5 feet and 100 feet, respectively, and the thickness 8, is preferably between 0.125 and 0.5 inches.

The fluorescent emission within the collector 2 is isotropic (i.e. same intensity in every direction), so that for limiting angle $\theta_c = \sin^{-1}(1/n)$, due to the refractive index n of the collector material, the fraction of the fluorescent emission that is guided by total internal reflection is:

$$f_{TIR} = \cos \theta_c = \sqrt{(n^2-1)}/n$$

For a typical value of n=1.5, this fraction is 0.7454, which is a majority of the emission. The fluorescent emission gains in intensity as it propagates sideways, but not indefinitely, because the fluorescent emission wavelengths are re-absorbed by the very same fluorescent material that produce them. In commercially available $\frac{1}{8}^{th}$-inch thick fluorescent plastic sheet available from CYRO Industries, shadows projected onto the planar face 4 are visible in the edge emission when they are no further than 4 inches from the edge 9. This indicates that the maximum luminance available at the edge 9 of the sheet is due to the material within 4 inches of the edge. Some of these guided rays will totally internally reflect off the edge 9. The fraction transmitted therethrough is $\sin \theta_c/\cos \theta_c = \tan \theta_c$, so that 10.5% undergoes TIR at n=1.5. (There would be no such edge-TIR when $\theta_c > 1$, which is the case for water, for which n=1.33.) The transmitted rays, slightly diminished by Fresnel reflections (4–10%), are emitted by the edge 9 with a distribution quite close to Lambertian. Preferably, the lens 3 reshapes this distribution into more useful ones, with suitable optical configurations deployed along the emitting edge 9 of the collector 2.

The configuration for an edge lens 3 that is convenient to make and use is a transparent cylindrical rod. The cylindrical lens 3 depicted in FIG. 1 comprises a cylindrical body having a length 11 and thickness 12. More specifically, the lens 3 is right circularly cylindrical in shape, which is because of widespread commercial availability. This shape makes a good magnifying lens, e.g., with power, so that the lens 3 is seen to have the brightness of the much narrower edge 9.

The length 11 of the lens 3 is preferably equal to that of the edge 9 to which it is attached, and its diameter is greater than collector thickness 8 of the collector plate 2, but the device is not so limited. Preferably, the lens 3 physically contacts the edge 9 of the collector 2 to form a substantially optically transmissive interface therebetween. More preferably, the lens 3 is index matched to the collector 2 to minimize reflection losses. Lens 3 and edge 9, however, need not make contact for the entire width 11 of output edge 9. For example, the lens 3 may be a fraction of the length 11 of the output edge 9 to which it is attached, or may only connect to the edge in periodic locations. In preferred embodiments, the lens 3 is attached directly to the collector 2. In other embodiments, another optical element may be inserted between the collector 2 and the lens 3.

Other types of lenses or beam-shaping optics 3 may be employed to control the output light from the edge 9 of the collector 2. These lenses and other beam-shaping optics may be refractive, reflective, and/or diffractive and may employ technology well known in the art as well as designs not yet developed. Other types of beam-shaping optical elements are discussed below. The term lens may be employed in connection with the beam-shaping optics but it should be understood that this element need not comprise a conventional refractive lens, but may include other types of optical elements that employ reflection or diffraction to shape the output beam.

Preferred methods for attaching the lens 3 to the collector 2 include solvent glues, and any comparable method that provides an optically clear joint with no air gaps or bubbles. Alternately, lens 3 and collector 2 can be mechanically connected with the aid of clamps, screws or other fasteners or may be designed to fit so snugly together that fasteners are not required. Preferably, the lens 3 comprises similar material to that of collector 2, but the lens 3 is preferably transparent and does not contain fluorescent materials, although it may in certain applications. The index of refraction for the two materials may be closely matched in order to reduce Fresnel reflection at the joint of the materials. Additionally, or in the alternative, an index-matching solution, possibly in the form of an adhesive, may be employed to minimize reflection losses. Other preferred embodiments will employ the same material for both pieces 2, 3, thereby completely eliminating the index difference. These pieces 2, 3 may, for example be fused together with the aid of a chemical solvent. In other embodiments the combination of collector 2 and lens 3 may be molded, or fabricated together, to form a monolithic piece.

Figure 2:
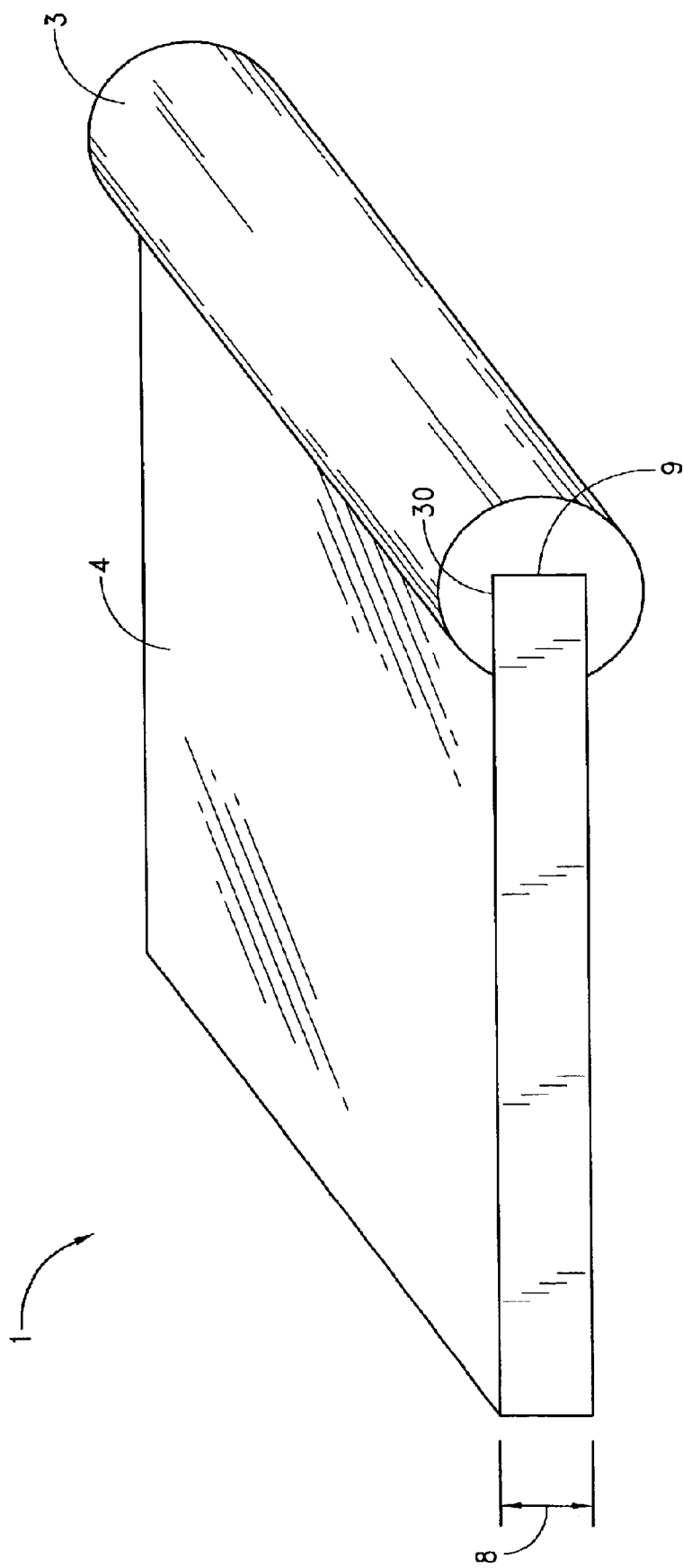
FIG. 2 is a perspective view of another embodiment of the lighting apparatus in which the refractive optical element comprises a cylindrical lens and the lens has a groove for attachment to the collector.

FIG. 2 shows another embodiment wherein an alternate form of joining the lens 3 to the collector 2 is employed. In this case, lens 3 comprises a groove 30, which preferably extends through the length 11 of lens 3. Groove 30 is designed to closely match the thickness 8 of the collector 2 at or near primary edge 9, allowing the primary edge of collector to be fitted inside the groove and to be bonded thereto. Again, this bonding process preferably involves index matching the two pieces 2, 3 as discussed above. This groove 30 may add structural stability to the joint of the lens 3 and the collector 2. In some preferred embodiments, the depth of the groove 30 is selected to position the primary edge 9 of the collector 2 appropriately (between center and edge of lens 3) to provide the desired field-of-view.

Preferably, the collector 2 contains a dispersed chemical species that will fluoresce in response to incident radiation having sufficient excitation energy. Examples of such fluorescent dyes are plentiful and include organic fluorescent dyes. U.S. Pat. No. 4,492,778 by Uwe et. al., which is incorporated herein by reference in its entirety, discloses one such dye and a method for putting it into plastic material. U.S. Pat. No. 6,103,006 by DiPietro discusses a number of such dyes and how to incorporate them into transparent plastics. U.S. Pat. No. 5,095,099 by Parkinson et. al. discloses a fluorescent dye comprising rare-earth chelates containing a phenalenone nucleus. U.S. Pat. No. 6,103,006 by DiPietro as well as U.S. Pat. No. 5,095,099 by Parkinson et. al., are also hereby incorporated herein by reference in their entirety.

Figure 3:
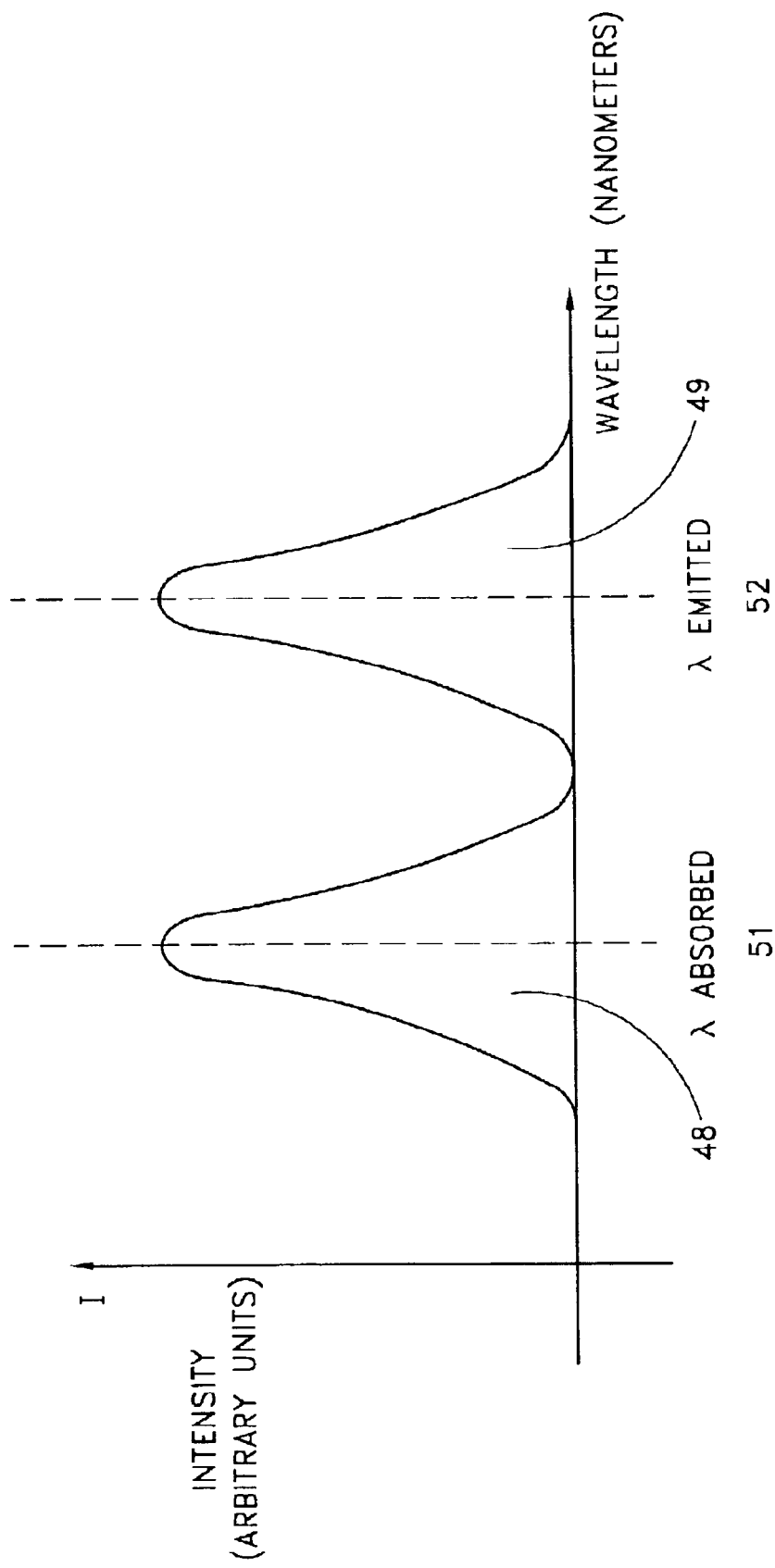
FIG. 3 is a graph on axis of intensity, in arbitrary units, and wavelength in nanometers (nm), illustrating absorption and fluorescence.

As shown in FIG. 3, such a chemical species will absorb light within a first wavelength range 48 and then re-emit light within a second wavelength range 49 that is longer in wavelength than 48. Pump radiation having wavelengths within a material's absorption band 48 is absorbed, and radiation of longer wavelengths 49 is emitted in a sufficiently narrow emission band to be perceived as colored, but preferably in all directions (i.e., unrelated to the direction of absorbed light). The absorption and emission bands are shown as being centered about absorption and emission wavelengths, $\lambda_{absorption}$ 51, and $\lambda_{emission}$ 52. Typical dyes have an absorption band at least 50 nanometers (nm) shorter than the emission wavelength but the absorption band is typically, although not always, relatively broad. The absorption band may, for example, be between about 30 to 50 nanometers full width half maximum (FWHM) or bigger. Preferably, this fluorescent chemical is adapted to absorb blue and near-ultraviolet (UV) light in the range of between about 350 and 450 nanometers (nm) such as from the sun or UV emitting light emitting diodes (LEDs), more preferably in the range between about 380 and 410 nm, and then re-emit light in the visible spectrum, within the range of between about 500 and 650 nm but may be between about 430 and 1700 nanometers. Longer and shorter wavelengths are also considered possible.

Advantageously, the lighting system 1 illustrated in FIG. 1 can be employed during daylight hours. Sunlight incident on the collector 2 will stimulate the fluorescent material contained within the collector 2. Fluorescent light will preferably be emitted in all directions from points within the collector 2. A major fraction of the emitted light will satisfy the conditions for total internal reflection (TIR), i.e., the light will be emitted from within the collector 2 at an angle that will satisfy the conditions for waveguide propagation within the collector. Confined propagation of this type is well known in the art. The angle at which the fluorescent light is incident on the surfaces of the waveguide from within, need only to be greater than the critical angle measured from a normal to the surface. This critical angle is given by the equation $\theta_c=\sin^{-1}(n/n')$, where n, and n' are the indices of refraction for the body material and the surrounding medium, respectively. Another fraction of the fluorescent light may be directed toward the outer edges of the collector 2. This fraction will be reflected back into the collector 2 by the preferably specular reflective coating on the non-lensed edges 10. Preferably, a majority of the light within the collector 2 will ultimately be propagated toward the lensed edge 9 in this fashion.

Light emitted by the fluorescent material that satisfies the conditions for total internal reflection and that propagates along the body of the collector 2 will be either transmitted from the output edge 9 or reflected by the reflective layer on one of the edges 10 that reflect light. The amount of light which is not reflected at one of the edges 10, not re-absorbed within the collector material, and not transmitted from the top 4 or bottom 5 of the collector 2, for example by scattering off of a scatter center in the collector material, is successfully propagated through the material toward the output edge 9. To maximize output, therefore, it is desirable for the non-output edges 10 to be provided with the reflective layer 1, which will redirect the light, preferably via specular reflection, for emission from the output edge 9 or further stimulation of fluorescence. Diffuse reflectors may also be employed.

Lens 3 may have a cylindrical shape because such plastic rod is available over-the-counter in a wide variety of diameters and materials. This shape, however, is not optimally efficient, because some of the rays coming out of edge 9 suffer total internal reflection instead of being refracted into the output beam.

Figure 4A:
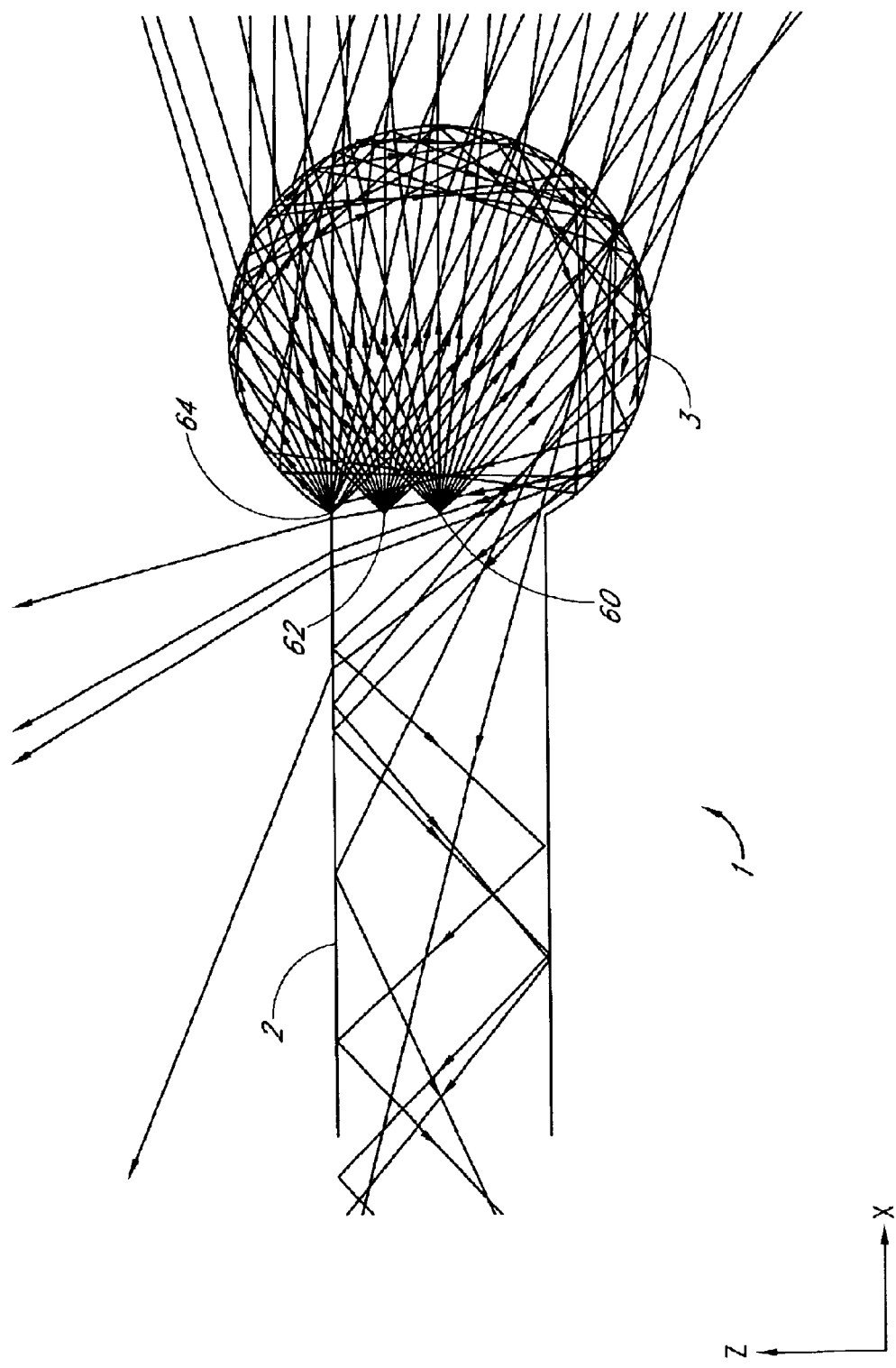
FIGS. 4A and 4B are views of one embodiment of the lighting apparatus showing ray fans corresponding to rays guided within the collector slab that are in and out of the paper, respectively, and the lensing of some and trapping of peripheral others.
Figure 4B:
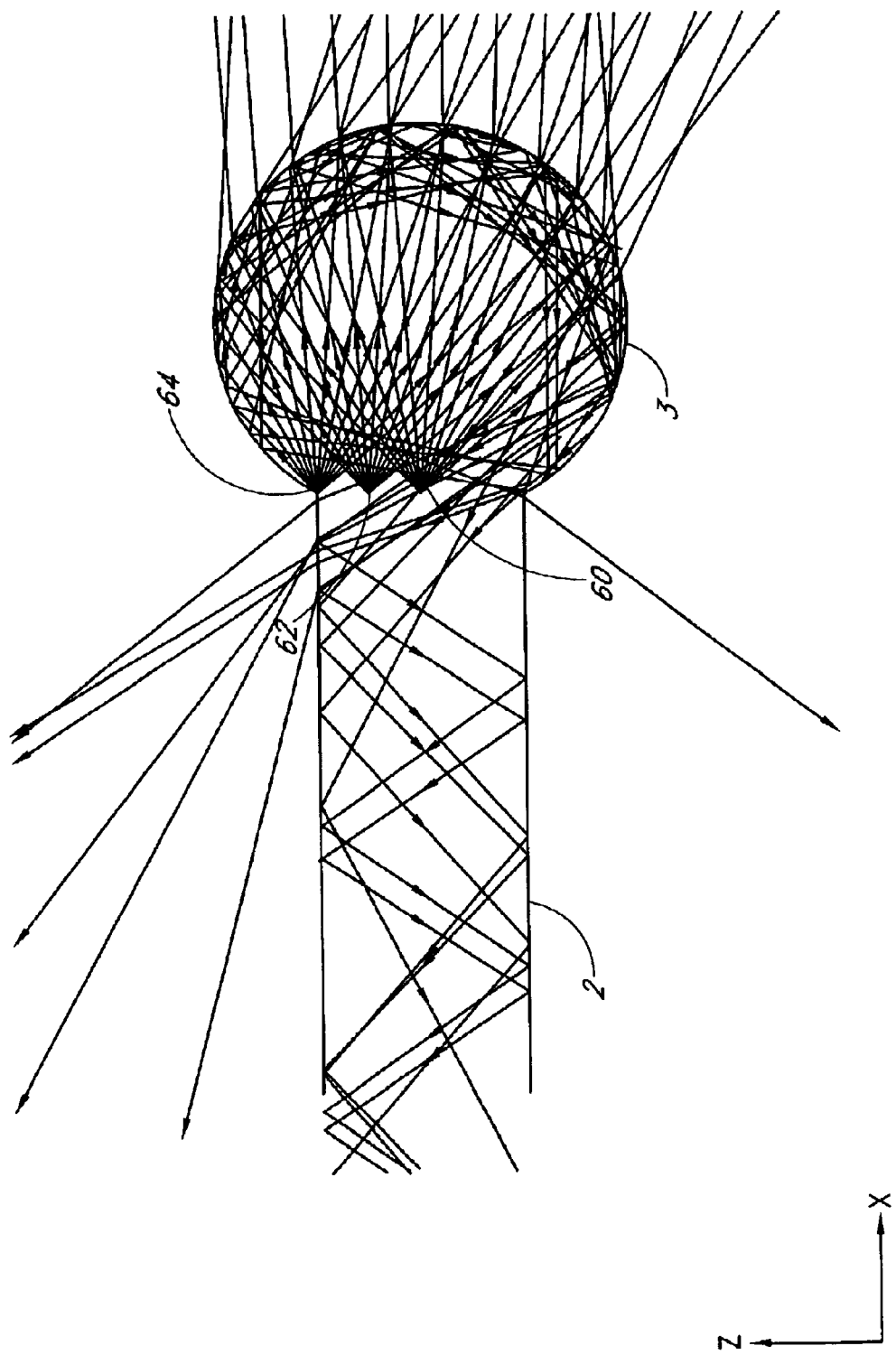

FIGS. 4A and 4B show side views of the collector 2 as it delivers light to lens 3 through the primary emitting edge 9. In particular three fans of rays that are in a plane perpendicular to the length 11 of the lens 3, i.e., in the plane of the paper or in the XZ-plane, (see FIG. 4A) and three fans 30° out of the plane of the paper (see FIG. 4B) are depicted. In the apparatus of FIG. 4A, all of the rays of central fan 60 become part of the output rays; whereas increasing portions of lateral fan 62 and edge fan 64 become trapped in lens 3. In the apparatus of FIG. 4B, however, trapping in lens 3 is increased by the fan being out of the plane perpendicular to the length 11 of the lens 3 (i.e., out of the plane of the paper or the XZ plane).

Figure 5A:
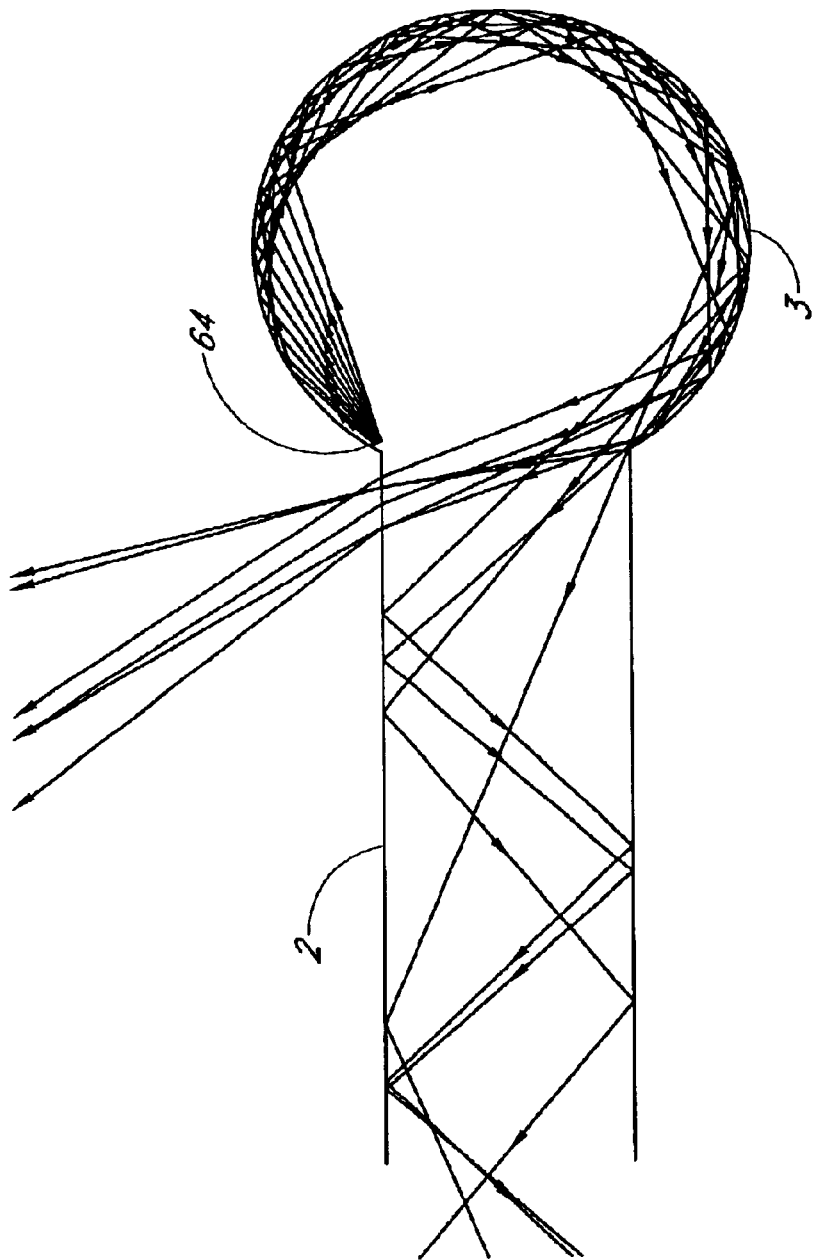
FIGS. 5A and 5B are views of one embodiment showing rays trapped within the cylindrical lens, and how a greater fraction of out-of-plane rays are trapped.
Figure 5B:
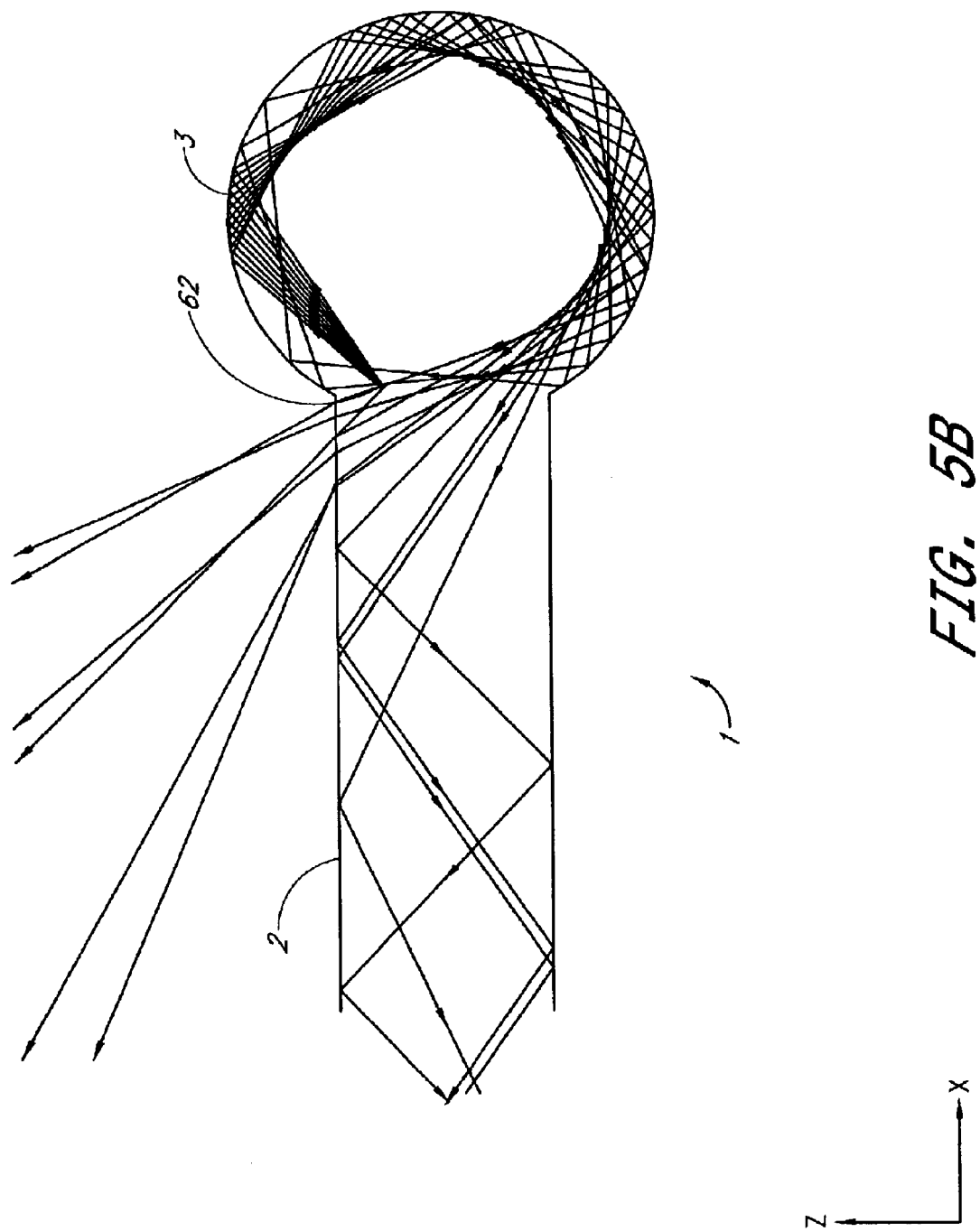

FIGS. 5A and 5B show two side views of these trapped rays. FIG. 5A shows the portion of edge fan 64, in the plane of the paper (i.e., the XZ plane), that is internally reflected with lens 3. FIG. 5B shows the portion of lateral fan 62, that is internally reflected.

Figure 6A:
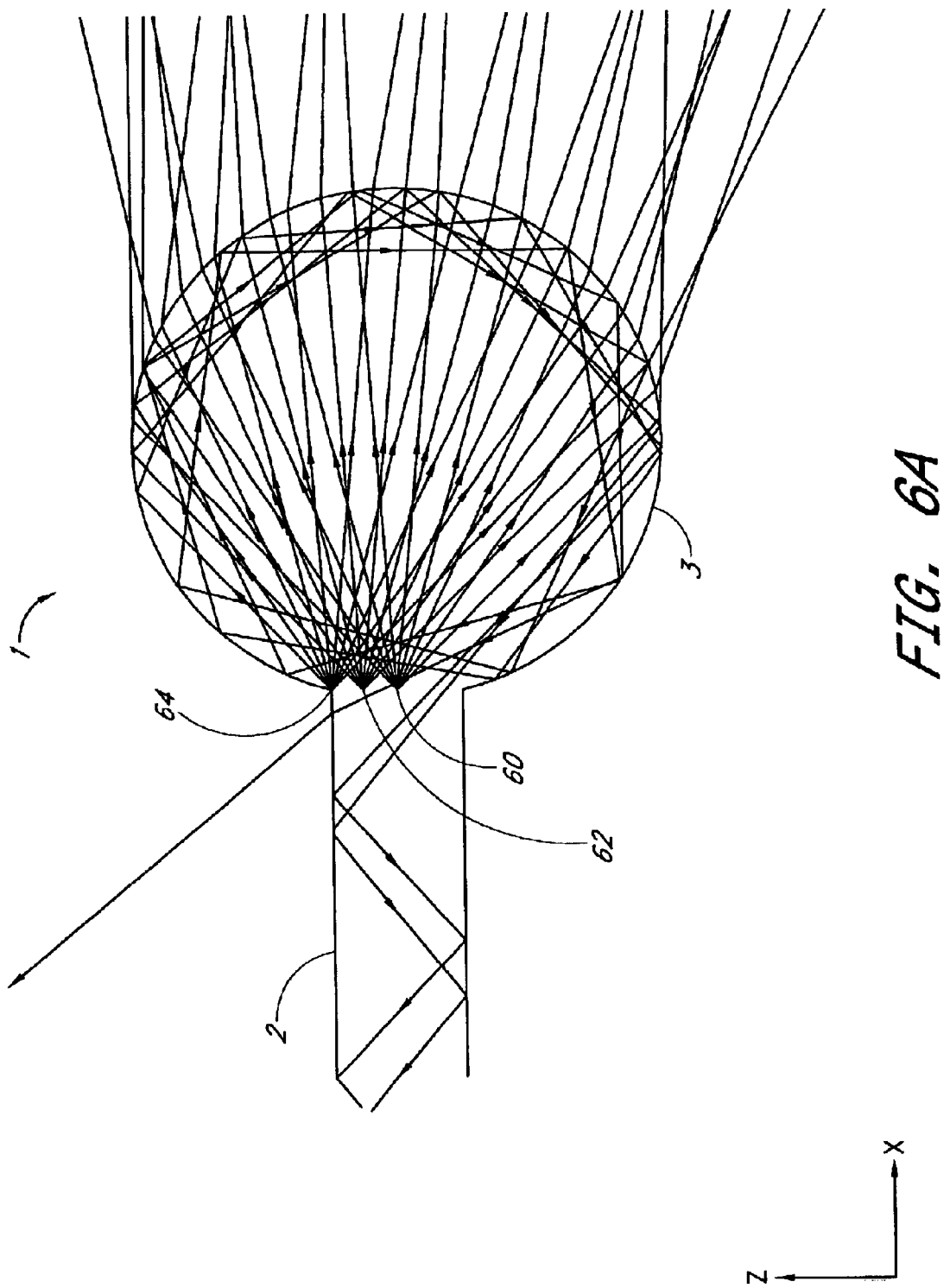
FIGS. 6A and 6B are perspective views of another embodiment in which a larger lens also traps many rays.
Figure 6B:
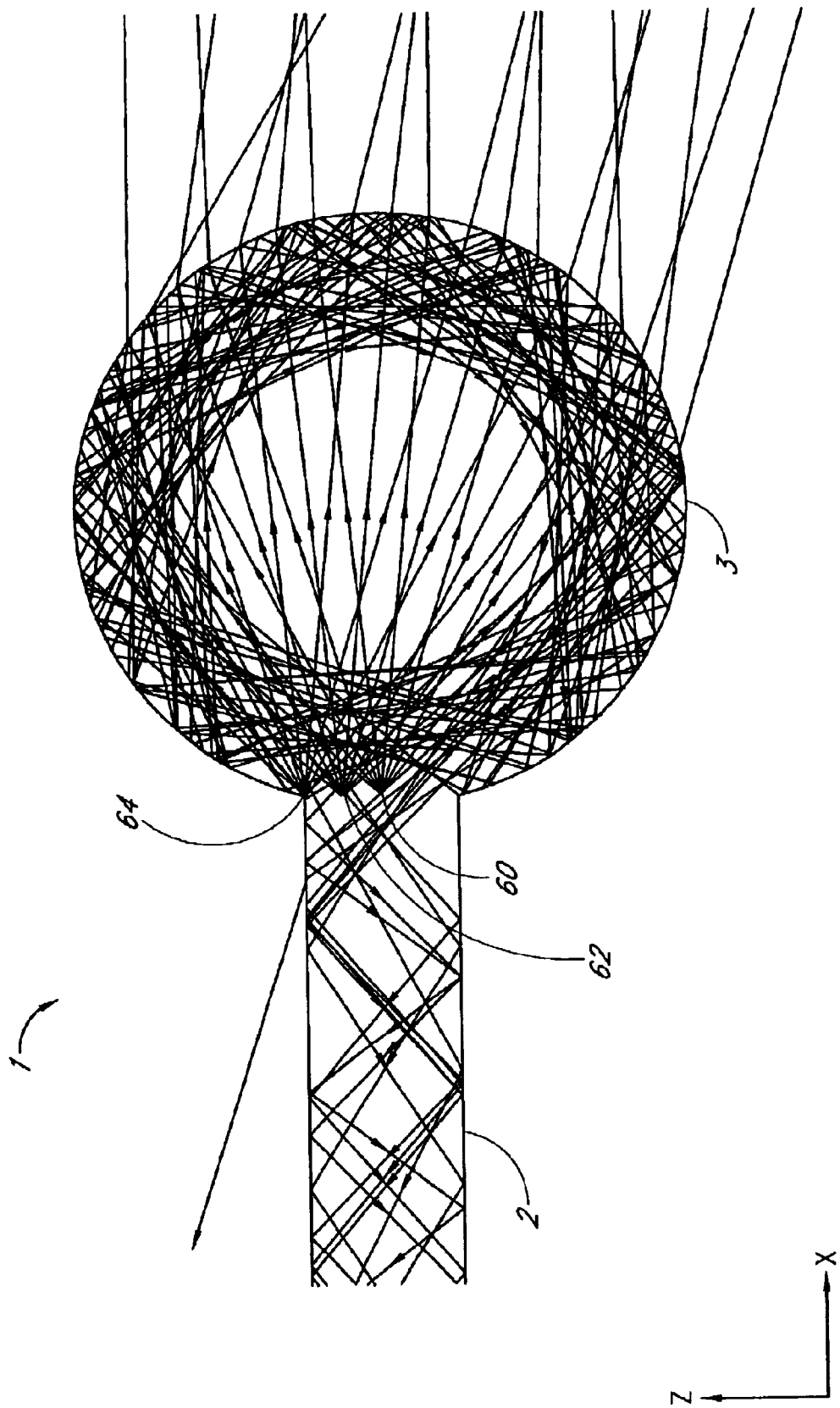

FIG. 6 shows the effect of increasing the size of lens 3 to four times the thickness of the collector 2. The reduction in output of light caused by trapping is not alleviated. FIG. 6A shows that about 10% of the rays are trapped when the fans are in the plane of the paper. FIG. 6B shows that for fans that are tilted 30° out of the plane of the paper, the trapping goes to 30%. In spite of the practical convenience and commercial affordability of the cylindrical shape of such a lens, it is not ideal in terms of optical efficiency, due to the illustrated trapping of rays within the lens 3 herein illustrated with a circular cross-section.

Other shapes can be utilized for lens 3, but shapes with constant cross-section will not put 100% of the light from the primary edge 9 into the output beam. The light emitted by edge 9 extends $\pm\theta_c$ in the vertical plane (plane perpendicular to the length 11 of the lens 3 and parallel to the XZ plane), but $\pm 90°$ in the horizontal plane (perpendicular to the vertical plane and parallel to the XY plane and which coincides with the length of the lens). Of the latter range, only rays in the range $\pm\theta_c$ in the horizontal plane will be refracted out of the lens 3 into the exterior horizontal range $\pm 90°$, regardless of the shape of its cross-section. Because the distribution of light from the slab waveguide 2 is nearly Lambertian, the fraction of rays contained in the horizontal angular range $\pm\theta_c$ will be $\sin\theta_c$. The remainder, or $1-\sin\theta_c=(n-1)/n$, which is about one-third for n=1.5, will be trapped in the lens 3. Much of this trapped light will be emitted by the ends of the lens 3, with the rest eventually absorbed and re-emitted by the fluorescent dye in the collector 2. Including the dye in the lens 3 itself would therefore increase the fluorescent emission that escapes from the lens.

Figure 7A:
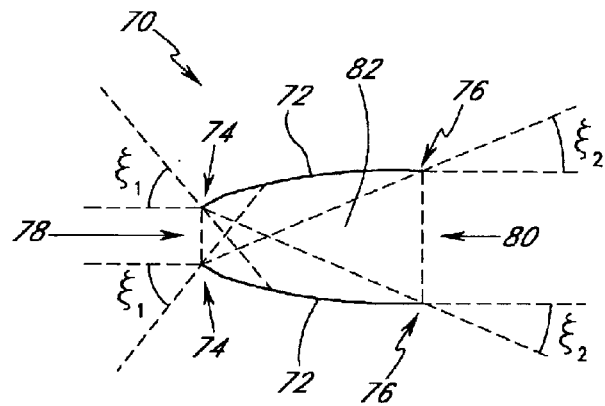
FIGS. 7A–7C are schematic drawings of non-imaging optical elements that provide symmetric and asymmetric field-of-views.
Figure 7B:
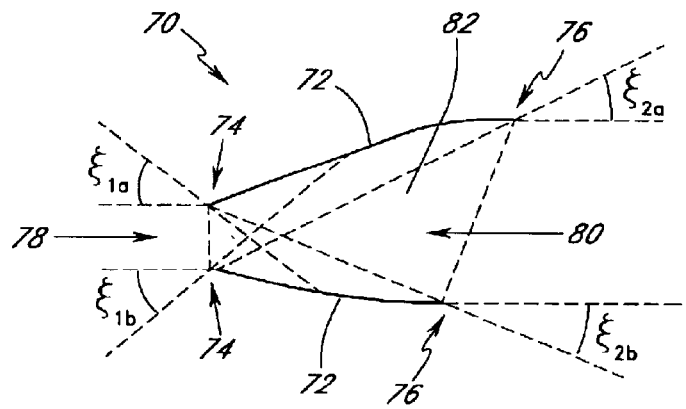
Figure 7C:
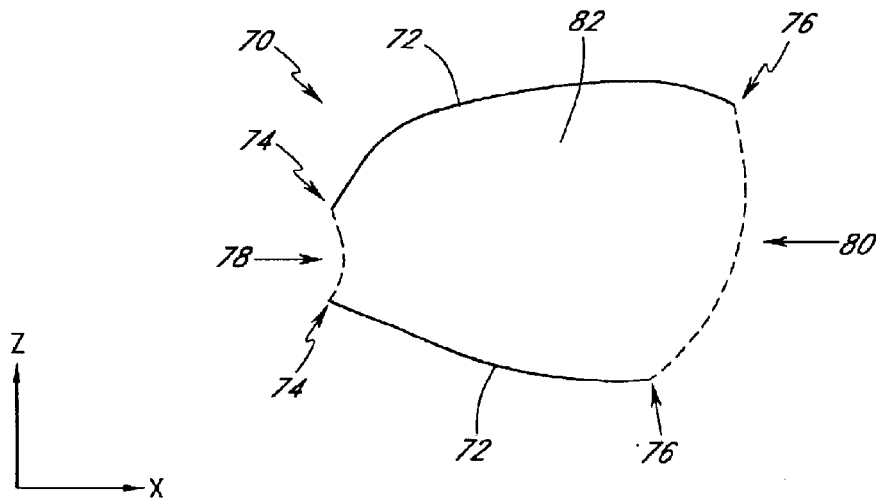

In order to eliminate the trapping shown in FIGS. 5A, 5B, 6A, and 6B, other profiles are preferred over the easily manufactured right circular cylinder. Non-imaging optical elements may provide one solution. In particular, non-imaging optics theory is employed to design suitable profiles for lenses or beam shaping optics juxtaposed adjacent a fluorescent slab to add this otherwise lost light to the output beam. Non-imaging optical elements can increase or maximize optical throughput because image formation is not the goal. Instead, by designating the extremes, edge rays that establish the bounds of both the input and output rays, a lens shape can be generated that collects each of the input rays and redirects them into a desired distribution of output rays. Thus, substantially all the rays within the bounds of these edge rays are transmitted through the optical system. Non-imaging optical elements are particularly well suited for efficiently coupling light emanating from a narrow aperture into a wide one of the same brightness, while reciprocally transforming a wide field-of-view into a narrow one. Such non-imaging optical elements 70, possible cross-sections of which are shown in FIGS. 7A–7C, may comprise one or more contoured reflective surfaces 72 delimited by rearward and forward edges 74, 76 that form boundaries for separate first and second apertures 78, 80. Confined between the reflective surfaces 72 is a cavity 82 that extends from the first aperture 78 and to the second aperture 80. Light enters this cavity through the first aperture 78, possibly reflects from the reflective sidewalls 72, and refractively exits therefrom through the second aperture 80.

Suitable non-imaging optical elements 70 may include mirror varieties having mirrors for reflective surfaces 72 as well as waveguide varieties having reflective surfaces that rely on total internal reflection. In the mirror varieties, reflective surfaces 72 may comprise surfaces appropriately contoured and metalized to reflect light. In contrast, the waveguide varieties are created by shaping sidewalls of a transparent medium to cause light within the medium to reflect from sidewalls in an appropriate direction via total internal reflection. In the waveguide variety, the cavity 82 is filled with a material such as glass or polymer-based materials having sidewalls that correspond to the reflective surfaces 72. The reflective surface 72 may be formed at a boundary between the sidewalls and air or at a boundary between the sidewall and a cladding layer surrounding the transparent medium, either of which are possible depending on how the non-imaging optical element 70 is implemented. Examples of material preferably employed as the transparent medium for the non-imaging optical element 70 include acrylic, polycarbonate, and silicone. In contrast with the waveguide variety, the cavity 82 in the mirror variety may be filled either with air or other transparent media. Reflection is provided by the metalization or material with high reflectivity, instead of by total internal reflection.

Preferably, the non-imaging optical element used as the lens or beam-shaping optics 3 is of the waveguide variety and more preferably, similar or identical material is employed as the transparent medium forming the non-imaging optical element and that forming the collector 2. Additionally, the lens or beam-shaping optics 3 may be fused to the collector 2. In particular, the collector 2 may be fabricated using a mold that also provides for the lens 3. Forming the collector 4 and the lens 3 from the same mold, thereby integrating the two elements into a monolithic light-guide, simplifies manufacturing, improves structural integrity, and reduces reflection loss that might otherwise occur where the non-imaging optical element 70 is optically separate from the collector.

As is well known, non-imaging optical elements 70 are especially well-suited for redirecting a substantially large portion of light incident on the first aperture 78 at an angle no more than $\pm\xi_1$ through the second aperture 80 at an angle no more than $\pm\xi_2$. Accordingly, a given non-imaging optical element 70 can be characterized by its input field-of-view $\pm\xi_1$ and its exit field-of-view $\pm\xi_2$. Well known techniques for selecting the appropriate shape of the reflective sidewalls 72 for specific values of $\pm\xi_1$ are $\pm\xi_2$ are given in *Ideal concentrators for finite sources and restricted exit angles*, by A. Rabl and W. T. Winston in Applied Optics, Volume 15, pp 2880–2883, 1976, which is incorporated herein by reference. More general references are *High Collection Nonimaging Optics*, a book by W. T. Welford and R. Winston, Academic Press, Inc. San Diego, 1989, and SPIE's Volume MS106 *Selected Papers in Nonimaging Optics* edited by R. Winston, 1995 which are also incorporated herein by reference.

The configuration shown in FIG. 7A is that of a compound parabolic concentrator (CPC). The CPC design and the defining parabolic shape is well known in the art and is discussed in detail by W. T. Welford and R. Winston in "The Optics of Nonimaging Concentrators," Academic Press, New York, 1978, pp. 171–173, which is incorporated herein by reference. See also U.S. Pat. No. 4,130,107 issued to Rabl et al, and the following U.S. Pat. Nos. 4,114,592, 4,230,095, 4,237,332, 4,240,692, 4,359,265, and 4,387,961, issued to Winston which are each hereby incorporated herein by reference. These CPCs function by employing the same total internal reflection that traps so much light in the cylinders previously discussed. With CPCs however, the majority of the light emitted by the primary edge 9 is directed out the exit aperture 80 after being expanded spatially and narrowed angularly, in certain embodiments to the maximum extent possible.

Figure 8B:
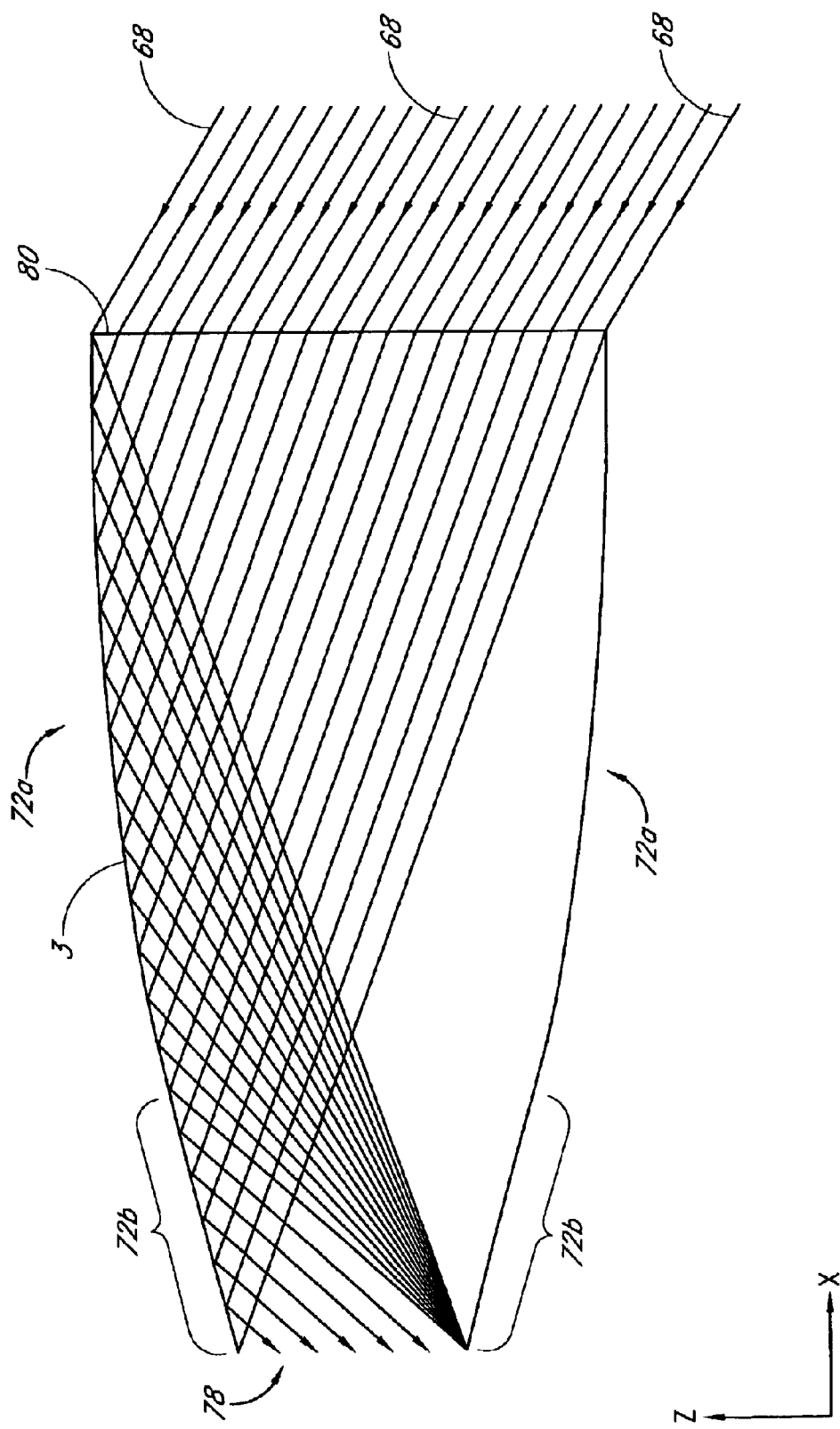

FIG. 8A shows a perspective view of a theta-transforming "trough" lens 2 with flat exit plane 66 that increases in width beyond the thickness 8 of the slab collector plate 2. Matching upper and lower sides 72 comprise tilted parabolic cross-sections 72a with planar sections 72b (see FIG. 8B). FIG. 8B shows how the shape of the curved cross-section is determined by reverse-ray-tracing, i.e., rays are propagated in reverse direction from the output aperture 80 into the CPC and out the input aperture 78. Extreme rays 68 passing through the output aperture 80 at 30° ($\xi_2$) are refracted to lesser angle $\sin^{-1}(\sin 30°/1.5)=19.5°$. The parabolic section 72a reflects these parallel rays oriented at an angle of 19.5° with respect to a central optical axis different amounts up to the maximum angle supported by the waveguide 2. The parabolic section 72a reflects these parallel rays through the CPC causing the rays to converge in a bundle at the primary edge 9 of the collector 2. For the remaining parallel rays, straight section 72b reflects them to the entrance aperture 78 at the same maximum angle supported by of the waveguide collector 2. Although this reverse-ray-trace is used as a method of generating these two subsections, they can operate in the opposite direction, that is, light from the collector 2 is coupled directly into the entrance aperture 78, reflected off the parabolic and straight sections 72a, 72b and out through the exit aperture 80. Preferably the non-imaging optical element is designed to magnify the diffuse waveguided light within slab 2 by narrowing its angular distribution of the emission from the primary edge 9.

Figure 8C:
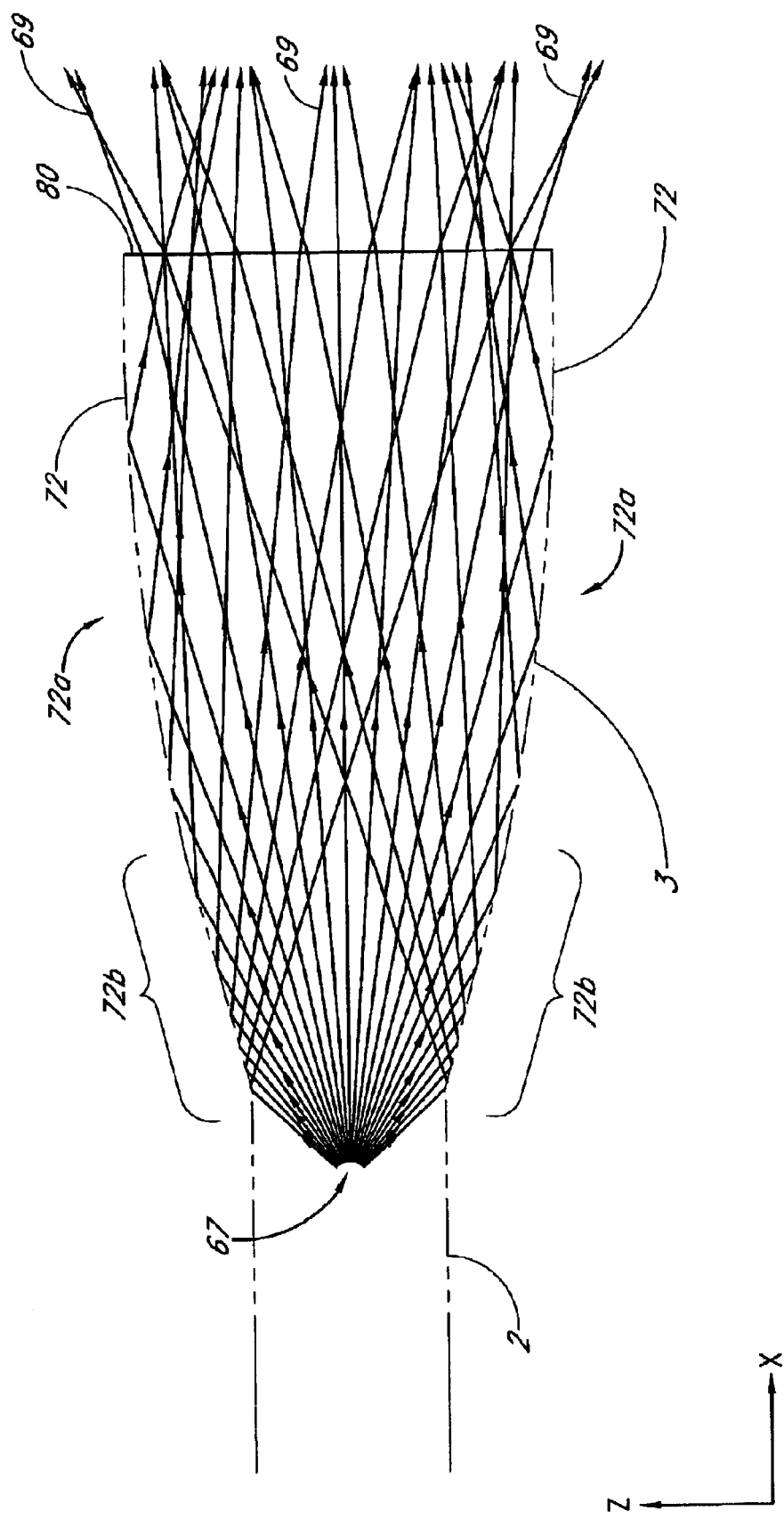
Figure 8D:
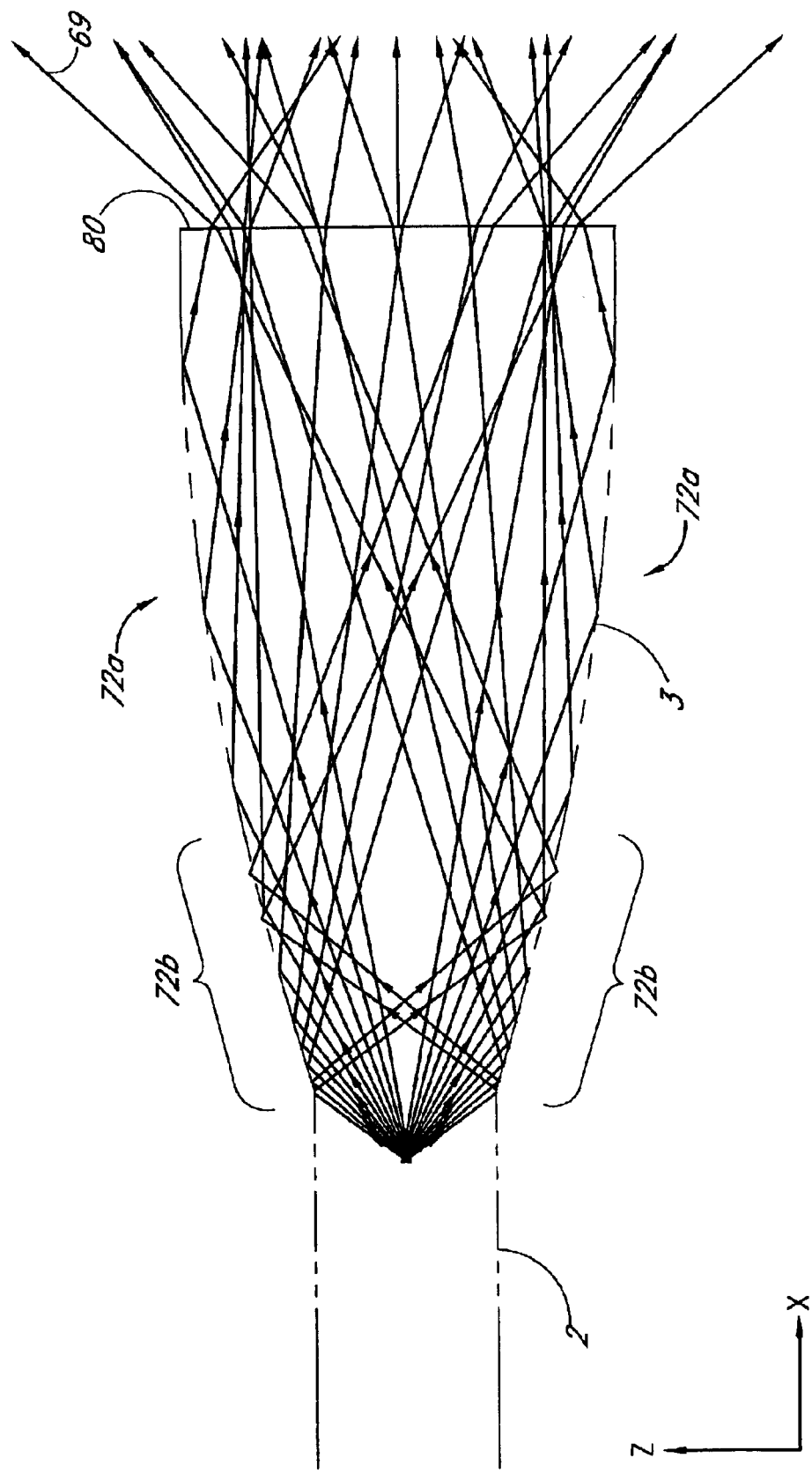
Figure 8E:
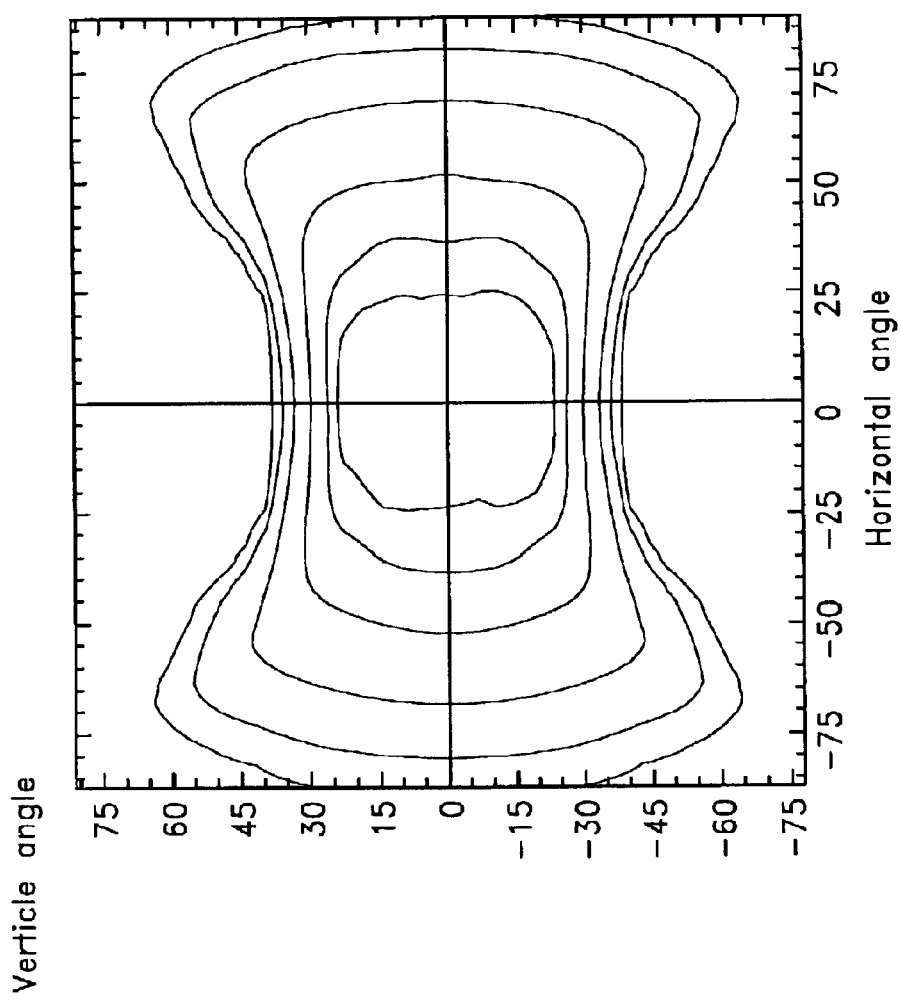
FIG. 8E is a plot of the output from the compound parabolic concentrator.

FIG. 8C depicts guided-ray fan 67, contained in the plane perpendicular to the length 11 of the lens 3 (i.e., in the plane of the paper or XZ plane), which is refracted into output bundle 69. This output beam subtends ±30° in air, as compared to the original range of ±48° within the slab 2. FIG. 8D depicts a similar fan, but tilted 38° from the plane of the paper. Output fan 69 is wider than the nominal ±30°, because of the nonlinearity of Snell's law. The diffuse rectangular input distribution results in a 'bow-tie' output distribution as shown in FIG. 8E. This distortion of the rectangular shape of the guided-light angular distribution is due to the non-linearity of Snell's law, as the angle of incidence approaches the critical angle.

Figure 9A:
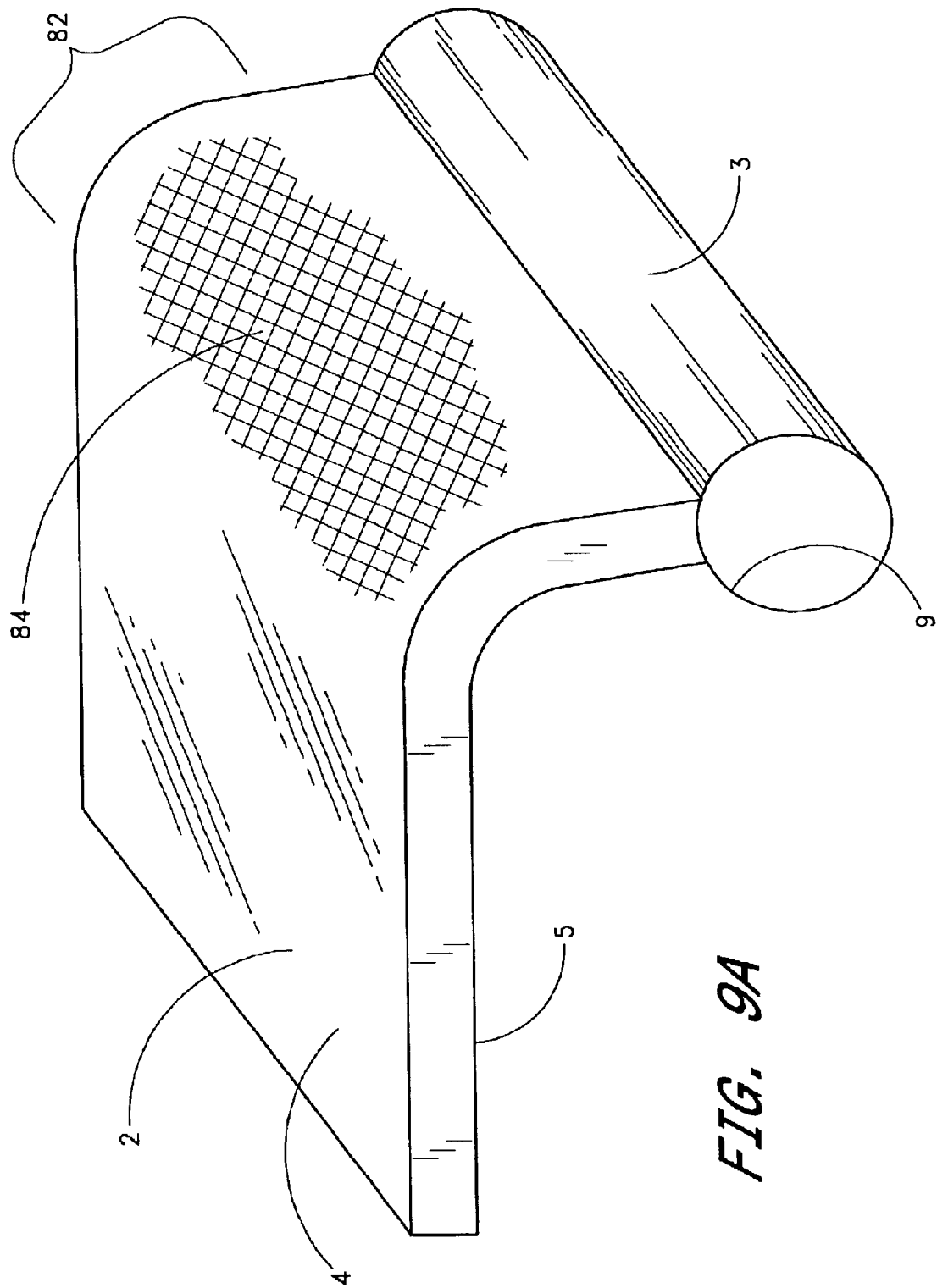
FIGS. 9A and 9B are perspective views of a bent collector/waveguide that aims light output downward.

In the embodiment illustrated in FIG. 9A the collector 2 is bent. Such a bend may be desirable for applications in which the invention is to be mounted, for example, on the top of a building. This orientation would direct the light output downward to be visible by a person on a street below. As shown, the collector 2 includes a bent portion 82 that comprises a coating 84, preferably, on one or both the top and bottom surfaces 4, 5 of the collector. The bent portion 82 may be coated with a substance that causes light within the collector 2 to be reflected from the top or bottom surface 4, 5 in the area in which it is applied. This coating 84 is preferably specularly reflective such as that described in FIG. 1. In other preferred embodiments, the coating substance may comprise any of a variety of types of reflective material, such as for examples metal films like aluminum, copper, silver, or gold, depending upon the color of the fluorescent light. The reflective coating 84 prevents light directed at an angle less than the critical angle from escaping from the collector 2. With the coating 84, the light will instead propagate to primary edge 9, and be emitted through the lens 3.

Figure 9B:
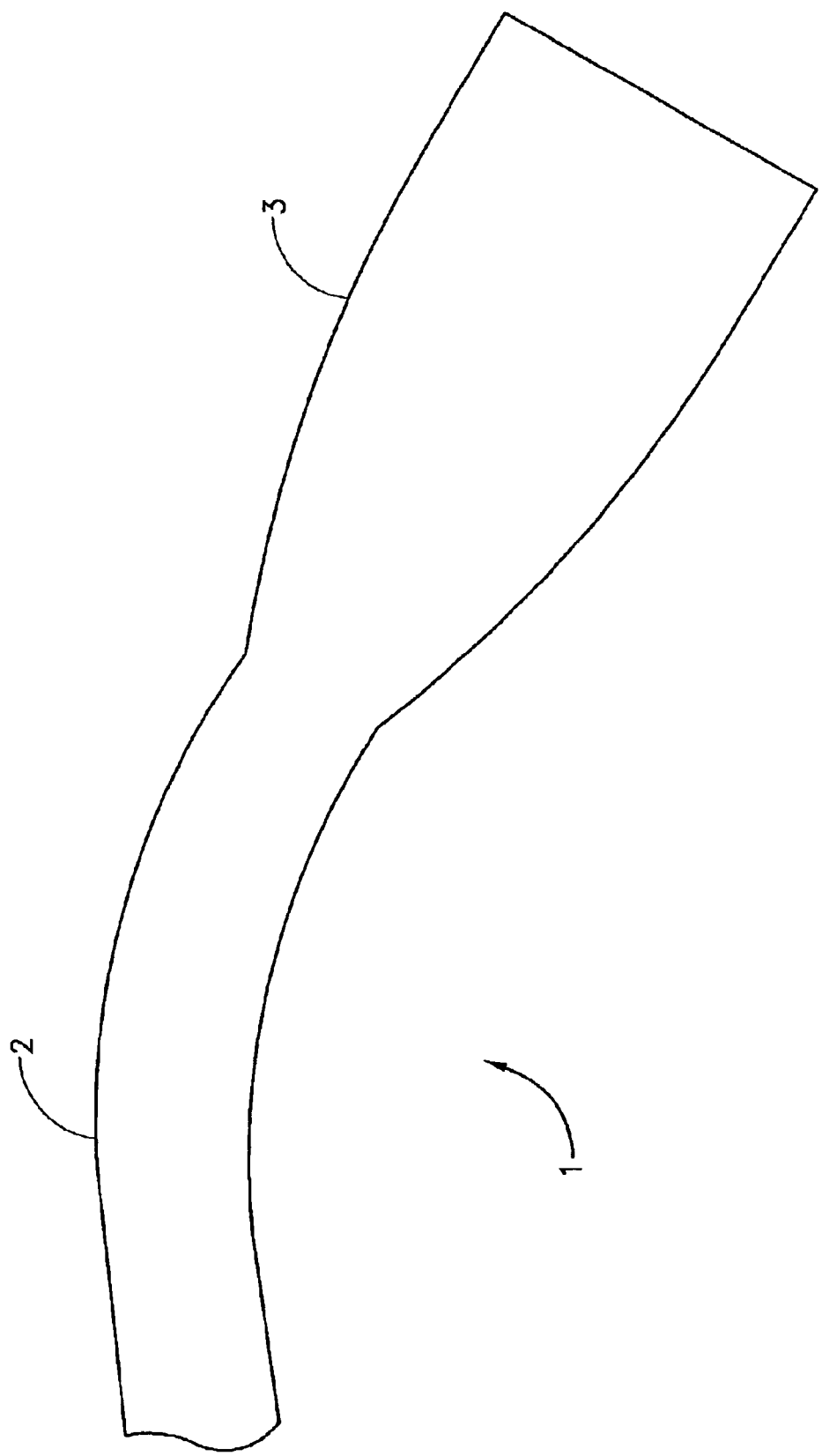

Rooftop-mounted solar-illuminated devices preferably have a downward bias in their output pattern, the preferred range being horizontal (parallel to the XY plane) to 60° below horizontal. One way of implementing this design is by bending the slab waveguide, as depicted in FIGS. 9A and 9B. Such a bend can cause a small energy loss if its radius of curvature is less than ten times the slab thickness. This particular configuration shown in FIG. 9B produces an output that extends downward 60° from the horizontal.

Asymmetric lens configurations that produce an asymmetric optical output are also possible. As shown in FIGS. 7B and 7C, light within a range defined by angles $+\xi_{1a}$ and $-\xi_{1b}$ can be received by the asymmetric non-imaging optical element 70 at the first aperture 78 while light within a range defined by angles $+\xi_{2a}$ and $-\xi_{2b}$ can be output by the non-imaging optical element at the second aperture 80, wherein, e.g., $+\xi_{1a} \neq -\xi_{1b}$ and $+\xi_2 a \neq -\xi_{2b}$. Asymmetric field-of-views are useful for controlling the direction of light emitted from the lighting apparatus 1.

The non-imaging optical elements 70 depicted in FIGS. 7B and 7C include top and bottom surfaces 72 having shapes different from each other. Accordingly, the non-imaging optical element 70 is asymmetric with respect to a horizontal plane (i.e., a plane parallel to the XY plane) located between the top and bottom surfaces 72. These non-imaging optical elements 70, when positioned with respect to the collector plate 2 as shown in FIG. 8A so as to receive light emitted by the output edge 9 of the collection are asymmetric about a plane passing through the collector plate 2 which is substantially parallel to the top 4 and bottom 5 of the collector plate. This asymmetry, i.e., the different contouring and shape of the top and bottom surfaces 72 of the non-imaging optical element 70, shapes the beam so as to direct the light asymmetrically with respect to said collector plate, e.g., preferentially upward or downward or to one side. In other words, the light is directed asymmetrically with respect to a plane substantially parallel to the collector plate 2 extending from the output edge 9. In various embodiments, for instance, the light is directed above or below the plane passing through the collector plate 2, which may be a horizontal plane substantially parallel with the XY plane referred to above.

Figure 10:
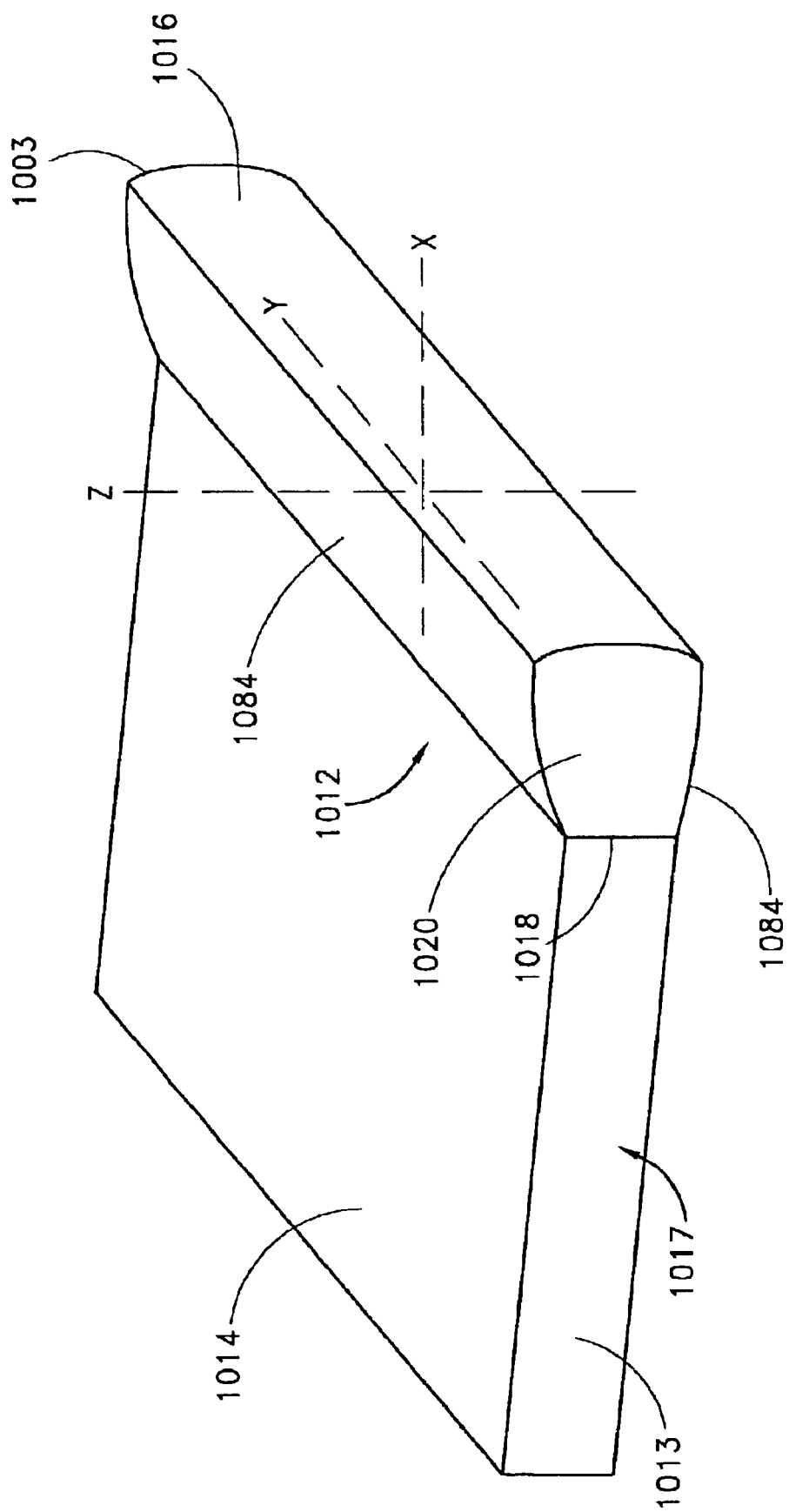
FIG. 10 is an isometric view of an embodiment of the lighting apparatus having a water-filled collector and lens.

An important application of this technology for rooftop installations employs fluid-filled optical elements, with the fluorescent dye dissolved therein. Economic factors dictate that the fluid be water, although the higher refractive index of glycerin may make it attractive for some smaller installations. As shown in FIG. 10, fluid-filled lens 1003 comprises top and bottom reflective surfaces 1084, in addition to the curved or flat, transparent front surface 1016 and curved or flat transparent rear surface 1018. Top and bottom surfaces 1084 preferably are specularly reflective. To provide for specular reflectivity, the surface may comprise metal, reflective tape. Although a flat front surface 1016 is optically preferable, structural strength may dictate some curvature. Similarly, rear surface 1018 may be planar or curved, or may be absent to allow the fluorescent-dyed liquid to communicate with the liquid in the lens 1003. Collector 1002 is a conventional water tank, but with a transparent top 1014. Sidewall 1015 is transparent while the others, and the bottom are not; although they preferably are lined with reflective material to promote a longer path length of sunlight within the fluid and to thereby maximize efficiency. Preferably, the sidewalls other than 1015 comprise metal, which provides adequate structural support and is reflective but may be a less expensive alternative to plastic sheets having sufficient thickness to support the weight of the liquid. Transparent top 1014 may also have a protective silicone overcoat, the lower refractive index of which will help alleviate TIR losses due to dirt and bird debris. One advantage of using fluorescent-dyed liquid is that the fluorescent dye, which breaks down with excess exposure to UV light from the sun, can be readily replaced to rejuvenate the fluorescent output of the lighting apparatus.

Figure 11:
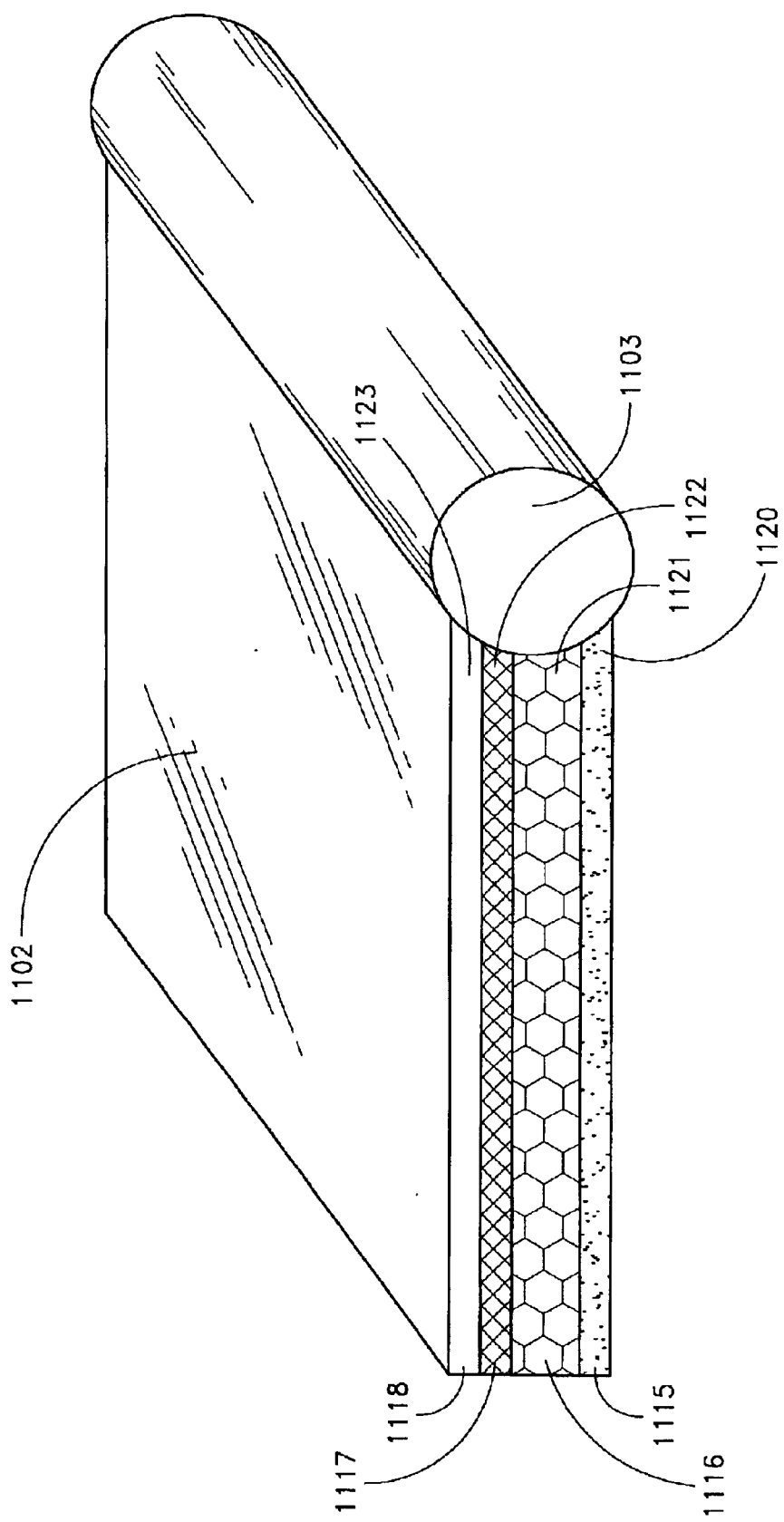
FIG. 11 shows an embodiment of the apparatus that comprises a plurality of layered sheets.

Other collector designs are also possible. As shown in FIG. 11, the collector 1102 may, for example, comprise a plurality of layers 1115, 1116, 1117, 1118 each of which contains a fluorescent material that differs from adjacent layers. The layers 1115, 1116, 1117, 1118 are arranged in a stack that together adjoins the lens 1103. The stack illustrated in FIG. 11 comprises four layers 1115, 1116, 1117, 1118 each having similar thickness; the stack may, however, include any number of layers and the thickness is not limited to constant thickness. For example, the top layer 1118 may have a smaller thickness than the other layers 1116, 1117, and 1118. The layers 1115, 1116, 1117, 1118 may be joined to each other by similar methods as used to cause the lens 3 and collector 4 of FIG. 1 to be connected. Each of the layers 1115, 1116, 1117, 1118 are joined to lens 1103 at their respective primary edges 1120, 1121, 1122, 1123. In other embodiments, the collector stack may be formed by selectively doping the collector material with dye during the molding process, thereby creating a single molded collector with regions of different chemical makeup. This technique will produce layering while eliminating the need to bond the individual layers to one another.

In yet another embodiment, fluorescent substances such as dyes may be distributed in a plurality of elongated segments extending the length 6 of the collector 2. The segments include different dyes to create regions of different color, shade, or hue along the primary edge 9 of the collector 2. More generally, fluorescent substances such as dyes can be arranged in different sorts of patterns within the collector 2 to create various regions of color therein. In some cases, the colors may be arranged such that the resultant output color, shade, or hue will be different than that of the colors in which the dyes fluoresce. For example, yellow, and blue fluorescent dyes might be arranged to produce a green output. In other embodiments, the colors may not combine at all; instead the output will appear multicolored.

Figure 12:
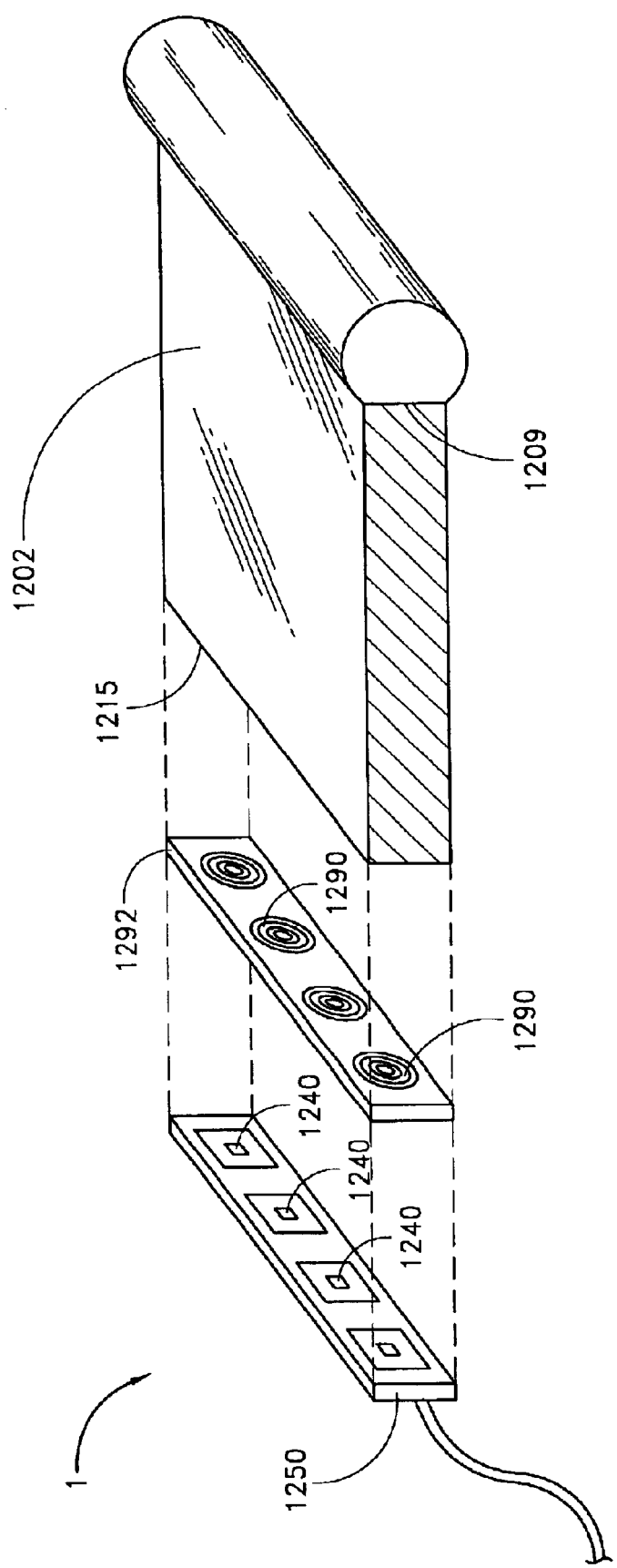
FIG. 12 is an exploded view of an embodiment of the apparatus with an attached set of light emitting diodes (LEDs) coupled to the collector by way of totally internal reflection lenses.

In another preferred embodiment shown in FIG. 12, a plurality of LEDs 1240 are positioned adjacent the proximal edge 1215 of the collector 1202, which is opposite the primary edge 1209. The LEDs 1240 are mounted on a printed circuit board (PCB) 1250 with output regions facing a plurality of total internal reflection (TIR) lenses 1290 located at the proximal edge 1215. The TIR lens 1290 may be integral with the collector plate 1202, being formed in the proximal edge 1215 by pressing or molding. In other embodiments, the TIR lenses 1290 may be contained on a polymeric strip 1292 attached to the proximal edge 1215 as shown in FIG. 12. Fabrication of the polymeric strip 1292 with the TIR lenses 1290 therein is preferably by injection molding or another comparable method. Preferably, an index matching solution, possibly in the form of adhesive, is employed to minimize reflection losses when mating the polymeric strip 1292 to the collector edge 1215. The printed circuit board 1250 is butted up against the polymeric strip 1292, which is positioned against the proximal edge 1215 of the collector 1202. The LEDs 1240 are located in such a fashion so as to direct light into the TIR lenses 1290 which efficiently couples the light into the collector 1202 through the proximal edge 1215. Using LEDs 1240 enables operation of the lighting apparatus 1201 during periods when ambient light levels are insufficient to pump the fluorescent material to a suitable level of luminance.

The light emitted by the LEDs 1240 and coupled into the collector 1202 preferably has a wavelength within the excitation band of the fluorescent material. Accordingly, the LEDs 1240 preferably emit wavelengths of light in the range between about 380 to 480 nanometers (nm) more preferably between about 300 to 410 nanometers; however, other wavelengths outside these ranges may be possible. This light will pump the dye preferably causing visible fluorescence within the collector 1202. Such visible fluorescent light may range between about 430 and 700 nm, and most preferably between about 525 and about 650 nm, but otherwise preferably between about 430 and 1700. Still other wavelengths are possible. In other embodiments, any of the other edges of the collector 1202 may be equipped with LEDs 1240 instead of having a reflecting layer attached thereto. Additional auxiliary pump lighting can thereby be provided. In these embodiments, it is preferred that the edges that do not contain LEDs 1240 be coated with a specularly reflective layer similar to that described in FIG. 1. Furthermore, although the LED is preferred as an inexpensive rugged low power-consumption illumination device, other methods of lighting such as incandescent, fluorescent, or coherent light may be used where appropriate. Also, the LEDs 1240 or other light sources need not pump the fluorescent material in the collector 1202 but may be employed simply to inject into the collector light which does not induce fluorescence. This light may exit the collector 1202 through the lens 3 in a similar fashion as would the fluorescent light.

As shown, the TIR lenses 1290 are inserted between the LEDs 1240 and the collector 1202 so as to couple emission from the LED into the collector. These lens 1290 are designed to appropriately direct pump radiation into the collector plate 1605 and to distribute it (preferably uniformly) throughout. The TIR lenses 1290 may be used as collimators to collimate the LED emission or may simply produce a diverging beam. In alternative embodiments, suitable optical elements may be employed to otherwise distribute the light throughout the collector 1202 in some fashion that induces fluorescence and produces the appropriate effect.

Figure 13:
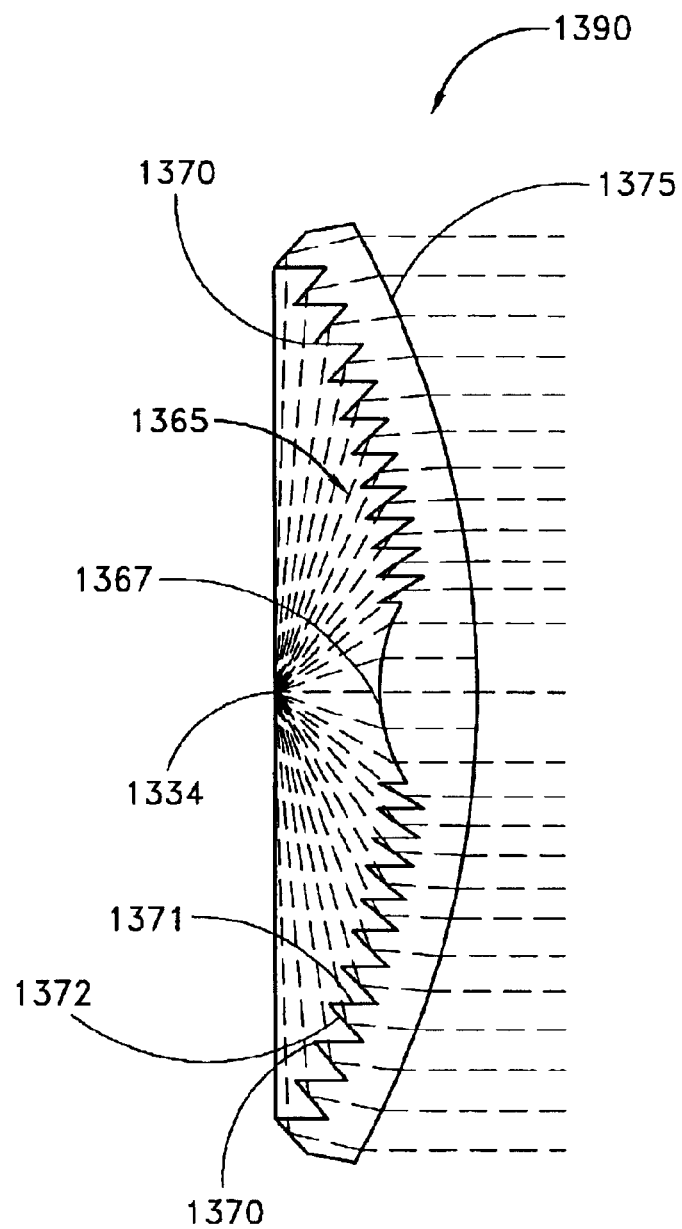
FIG. 13 shows a cross-section of a total internal reflection lens.

FIG. 13 depicts an exemplary TIR lens 1390 that is also described in U.S. Pat. No. 5,806,955 issued to Parkyn, Jr. et. al., which is hereby incorporated herein by reference. This lens 1390 preferably comprises transparent material such as for example glass or plastic. As shown, the lens 1390 has a first generally concave contoured inner surface 1370 and a second smooth outer surface 1375. The inner surface 1370 faces and partially surrounds a source of light 1334 centrally located adjacent the lens 1390. The contoured inner surface 1370 comprises a plurality of annular features 1370 centered about a common axis passing through the lens 1390. Each of these annular features 1370 has a center-facing facet 1371 through which some of the light from the light source 1334 passes and an oppositely facing total internal reflection facet 1372, which is angled relative to the source such that rays incident thereon are reflected via total internal reflection. These total internal reflection faces 1372 are oriented so as to shape the beam of light as desired. These facets 1372 may, for example, be designed to produce a collimated beam of light from a source 1334 that approximates a point source. The lens 1390 also has a central portion 1367 that does not reflect light but that acts as a classical refractive lens. Together, the central portion 1367 and the annular features 1370 produce the intended beam shaping. Although a TIR lens 1390 is employed, other types of lens and optical elements may be employed to appropriately couple and distribute the LED emission into the collector plate 1202. Alternatively, light may be injected into the collector 1202 by simply placing the LEDs 1240 in the vicinity of the proximal edge 1215 of the collector. Lens 1290 or other optical elements need not be used to facilitate efficient transfer of light from the LEDs into the collector plate.

Figure 14:
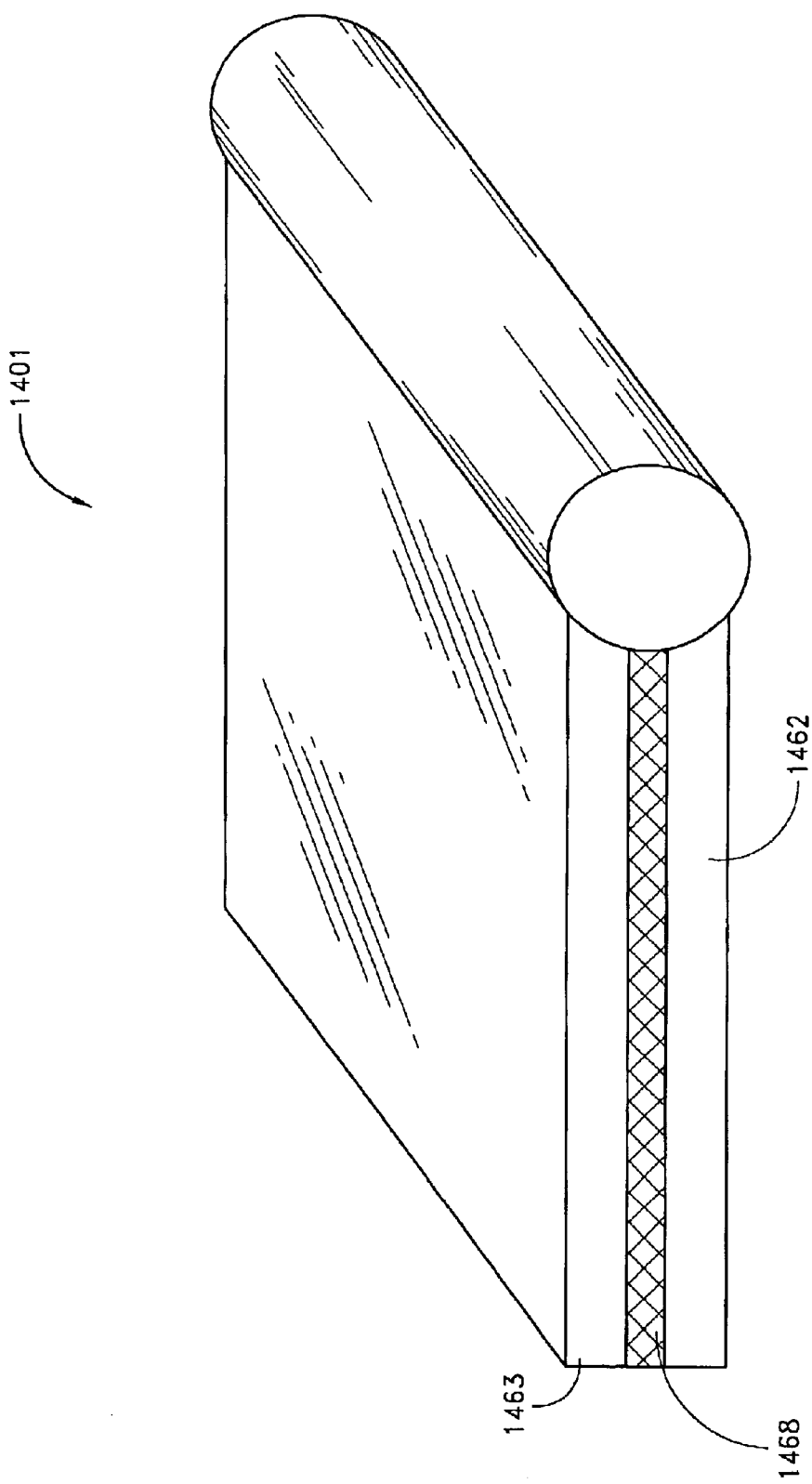
FIG. 14 is an isometric view of an embodiment of the apparatus wherein the collector includes a layer of quantum dots.

Also, although dyes have been described being capable of producing fluorescence in the embodiments described above, the design of the apparatus 1 is not so limited. Other fluorescence substances can also be suitably employed. As illustrated in FIG. 14, for example, the lighting apparatus 1401 may comprise a layer of quantum dots 1468 sandwiched between a base layer 1462 and a protective layer 1463. Quantum dots such as in the layer of quantum dots 1468 are well known in the art and are available from numerous sources. One kind of quantum dots, for example, is sold under the tradename Qdot® and is manufactured and distributed by Quantum Dot Corp. of Palo Alto, Calif. Some of the properties of quantum dots are described by David Rotman in "Quantum Dot Com," *Technology Review*, January/February 2000, pp. 50–57.

In the embodiment shown, the protective layer 1463, and the base layer 1462 are both transparent to radiation that can pump the quantum dots. Each layer has an index of refraction, n, greater than unity (e.g., approximately 1.5) in that wavelength region. Base layer 1462 and protective layer 1463 may comprise, for example, a polymeric material such as plastic. Base layer 1462 is sufficiently thick to support the layer of quantum dots 1468 when the protective layer 1463 is in place. The layer of quantum dots 1468 comprises an array of individual quantum dots spread across the base layer 1462. Preferably, the quantum dots are uniformly distributed over base 1462 in a single layer, preferably between about 2 to 10 nm thick.

In other embodiments, the quantum dots are interspersed throughout the collector 2, which simply comprises a material transparent to the pump and fluorescent radiation. As described above, the collector 2 in this case may comprise a polymer-based material such as acrylic or other plastics, glass, or any other suitably transmissive material. The quantum dots can be incorporated into the collector 2 in still other ways as well. The collector 3 may comprise quantum dot structures such as those described in co-pending U.S. patent application Ser. No. 09/800,067 entitled "Lighting Apparatus Having Quantum Dot Layer", now U.S. Pat. No. 6,744,960, which is hereby incorporated herein by reference.

The dots fluoresce, that is, they emit light at a particular wavelength in response to exposure to light, particularly sunlight. Thus, they can be employed as a fluorescent substance incorporated into the collector 3. Quantum dots provide the added advantage of not decomposing when exposed to ultraviolet light for extended periods of time, a drawback of many organic fluorescent dyes when used outdoors.

Accordingly, the lighting apparatus 1 which is capable of providing high contrast illumination during daytime operation, can be outfitted with an optical element 3 that suitably alters the distribution of light output from the collector 2. The optical element 3 may, for example, be configured to increase or decrease divergence of light emitted from the edge 9 and/or to direct the light emitted from the collector 3 above or below the collector. The optical element 3 may comprise a non-imaging optical element. The collector can comprise a plurality of stacked layers or a series of segments that fluoresce at different wavelengths so as to produce multicolored output. The collector 3 can also be infused with quantum dots to provide fluorescence.

The apparatus 1 can thus be used for signs or to decorate cars or other products. This apparatus is particularly well suited for incorporation in real property improvements such as buildings, towers, pavilions, canopies, silos, archways, columns, posts, walls, dividers, fences, rails, statues, sculptures, tunnels, platforms, decks, docks, and billboards. The apparatus may also be used in transportation, for example, on roadways, taxiways, planes, autos, boats, and trains. Sports equipment and accessories as well as playing fields and structures associated therewith may benefit from use of this apparatus. The apparatus is especially suitable for low intensity decorative lighting, that is, lighting sufficiently bright to be readily visible to the eye of an onlooker but that is not so bright as to light up the ambient environment. Lighting outlining an architectural structure, such as a skyscraper, may fit in this category of decorative lighting. The apparatus 1 may also be used to illuminate objects or for solar applications.

Many other applications of the apparatus 1 are considered possible; the relevant applications not being limited to those specifically recited above. Also, the present invention may be embodied in other specific forms. The embodiments described above are to be considered in all respects as illustrative only and not restrictive in any manner.

What is claimed is:

1. A lighting apparatus comprising:
   a collector plate comprising fluorescent material which radiates fluorescent emission when pumped with light having a wavelength shorter than that of said fluorescent emission, said plate comprising opposed surfaces oriented to provide a waveguide that permits at least a portion of the fluorescent emission to propagate towards edges of said plate;
   reflective material on at least one of said edges of said collector plate to confine light therein; and
   an elongated beam-shaping optical element extending along at least another edge of the collector plate and mounted to receive said fluorescent emission propagating in said collector plate;
   wherein the collector plate comprises liquid; and
   wherein said collector plate comprises water.

2. The light apparatus of claim 1, wherein said reflective material is included on two of said edges of said collector plate to confine light therein.

3. The lighting apparatus of claim 1, wherein said collector plate comprises a polymer based material.

4. The lighting apparatus of claim 3, wherein said collector plate comprises acrylic.

5. The lighting apparatus of claim 1, wherein said collector plate comprises a plurality of portions each comprising a fluorescent material having a different color.

6. The lighting apparatus of claim 5, wherein said collector plate comprises a stack of layers, each layer comprising a fluorescent material which radiates fluorescent emission having a different color.

7. The lighting apparatus of claim 1, wherein said collector plate is curved.

8. The lighting apparatus of claim 1, wherein said fluorescent material comprises quantum dots.

9. The lighting apparatus of claim 1, wherein said elongated beam-shaping optical element comprises a polymer based material.

10. The lighting apparatus of claim 9, wherein said elongated beam-shaping optical element comprises acrylic.

11. The lighting apparatus of claim 1, wherein said elongated beam-shaping optical element comprises liquid.

12. The lighting apparatus of claim 11, wherein said elongated beam-shaping optical element comprises water.

13. A lighting apparatus comprising:
   a collector plate comprising fluorescent material which radiates fluorescent emission when pumped with light having a wavelength shorter than that of said fluorescent emission, said plate comprising opposed surfaces oriented to provide a waveguide that permits at least a portion of the fluorescent emission to propagate towards edges of said plate; and
   an elongated asymmetric non-imaging optical element extending along at least one edge of the collector plate and mounted to receive said fluorescent emission propagating in said collector plates;
   wherein said asymmetric non-imaging optical element is configured such that said fluorescent emission is output from said asymmetric non-imaging optical element asymmetrically with respect to said collector plate.

14. The lighting apparatus of claim 13, wherein said non-imaging optical element comprises a compound parabolic reflector.

15. The lighting apparatus of claim 13, wherein said non-imaging optical element has two counter-opposing surfaces shaped differently to preferentially direct said fluorescent emission above or below said collector plate.

16. A lighting apparatus comprising:
   a collector plate comprising fluorescent material which radiates fluorescent emission when pumped with light having a wavelength shorter than that of said fluorescent emission, said plate comprising opposed surfaces oriented to provide a waveguide that permits at least a portion of the fluorescent emission to propagate through said collector plate towards an edge of said plate; and
   an asymmetric non-imaging optical element extending along said edge of the collector plate and mounted to receive said fluorescent emission propagating in said collector plate, said asymmetric optical element configured such that said fluorescent emission is output from said asymmetric optical element asymmetrically with respect to said collector plate.

17. A lighting apparatus comprising:
   a collector plate comprising fluorescent material which radiates fluorescent emission when pumped with light having a wavelength shorter than that of said fluorescent emission, said plate comprising opposed surfaces oriented to provide a waveguide that permits at least a portion of the fluorescent emission to propagate towards edges of said plate;
   an elongated optical element extending along at least one edge of the collector plate and mounted to receive said fluorescent emission propagating in said collector plate;
   one or more light sources disposed adjacent one edge of said collector plate to introduce light therein; and
   an optical element that facilitates injection of light from said light source into said proximal edge of said collector plate.

18. The lighting apparatus of claim 17, wherein said light sources comprise light emitting diodes (LEDs).

19. The lighting apparatus of claim 17, wherein said light sources comprise laser diodes.

20. The lighting apparatus of claim 17, wherein said optical element comprises a refractive lens.

21. The lighting apparatus of claim 17, wherein said optical element comprises a diffractive optical element.

22. The lighting apparatus of claim 17, wherein said optical element comprises a total internal reflection (TIR) lens.

23. The lighting apparatus of claim 22, wherein said elongated optical element physically contacts said edge of said collector plate such that light can be readily transferred from said collector plate to said elongated optical element.

24. The lighting apparatus of claim 23, wherein said elongated optical element is index matched to said edge of said collector plate thereby minimizing reflection losses.

25. The lighting apparatus of claim 17, wherein said one or more light sources emit at said wavelength shorter than said fluorescent emission to pump said fluorescent material.

26. A lighting apparatus comprising:
- a collector plate comprising fluorescent material which radiates fluorescent emission when pumped with light having a wavelength shorter than that of said fluorescent emission, said plate comprising opposed surfaces oriented to provide a waveguide that permits at least a portion of the fluorescent emission to propagate towards edges of said plate;
- reflective material on at least one of said edges of said collector plate to confine light therein; and
- an elongated beam-shaping optical element extending along at least another edge of the collector plate and mounted to receive said fluorescent emission propagating in said collector plate;
- wherein said elongated beam-shaping optical element comprises liquid.

27. The light apparatus of claim 26, wherein said reflective material is included on two of said edges of said collector plate to confine light therein.

28. The lighting apparatus of claim 26, wherein said collector plate comprises a polymer based material.

29. The lighting apparatus of claim 28, wherein said collector plate comprises acrylic.

30. The lighting apparatus so claim 26, wherein said collector late comprises liquid.

31. The lighting apparatus of claim 30, wherein said collector comprises water.

32. The lighting apparatus of claim 26, wherein said collector plate comprises a plurality of portions each comprising a fluorescent material having a different color.

33. The lighting apparatus of claim 32, wherein said collector plate comprises a stack of layers, each layer comprising a fluorescent material which radiates fluorescent emission having a different color.

34. The lighting apparatus of claim 26, wherein said collector plate is curved.

35. The lighting apparatus of claim 26, wherein said fluorescent material comprises quantum dots.

36. The lighting apparatus of claim 26, wherein said elongated beam-shaping optical element comprises a polymer based material.

37. The lighting apparatus of claim 36, wherein said elongated beam-shaping optical element comprises acrylic.

38. The lighting apparatus of claim 26, wherein said elongated beam-shaping optical element comprises water.

39. A lighting apparatus comprising:
- a collector plate comprising fluorescent material which radiates fluorescent emission when pumped with light having a wavelength shorter than that of said fluorescent emission, said plate comprising opposed surfaces oriented to provide a waveguide that permits at least a portion of the fluorescent emission to propagate towards edges of said plate; and
- an elongated non-imaging optical element extending along at least one edge of the collector plate and mounted to receive said fluorescent emission propagating in said collector plate;
- wherein said collector plate comprises liquid; and
- wherein said collector plate comprises water.

40. The lighting apparatus of claim 39, wherein said non-imaging optical element comprises a compound parabolic reflector.

41. The lighting apparatus of claim 39, wherein said non-imaging optical element has two counter-opposing surfaces shaped differently to preferentially direct said fluorescent emission above or below said collector plate.

42. A lighting apparatus comprising:
- a collector plate comprising fluorescent material which radiates fluorescent emission when pumped with light having a wavelength shorter than that of said fluorescent emission, said plate comprising opposed surfaces oriented to provide a waveguide that permits at least a portion of the fluorescent emission to propagate through said collector plate towards an edge of said plate; and
- an asymmetric optical element extending along said edge of the collector plate and mounted to receive said fluorescent emission propagating in said collector plate, said asymmetric optical element configured such that said fluorescent emission is output from said asymmetric optical element asymmetrically with respect to said collector plate;
- wherein said collector plate comprises liquid; and
- wherein said collector plate comprises water.

43. The lighting apparatus of claim 42, wherein said asymmetric optical element comprises a non-imaging optical element.

44. A lighting apparatus comprising:
- a collector plate comprising fluorescent material which radiates fluorescent emission when pumped with light having a wavelength shorter than that of said fluorescent emission, said plate comprising opposed surfaces oriented to provide a waveguide that permits at least a portion of the fluorescent emission to propagate towards edges of said plate; and
- an elongated non-imaging optical element extending along at least one edge of the collector plate and mounted to receive said fluorescent emission propagating in said collector plate;
- wherein said elongated non-imaging optical element comprises liquid.

45. The lighting apparatus of claim 44, wherein said non-imaging optical element comprises a compound parabolic reflector.

46. The lighting apparatus of claim 44, wherein said elongated non-imaging optical element comprises water.

* * * * *